US012783941B2

(12) United States Patent
Ru et al.

(10) Patent No.: US 12,783,941 B2
(45) Date of Patent: Nov. 3, 2026

(54) EXEMPLAR SELECTION ALGORITHM FOR INCREASED DENSITY OF EXTREME VECTORS

(71) Applicant: ORACLE INTERNATIONAL CORPORATION, Redwood Shores, CA (US)

(72) Inventors: Keyang Ru, Kirkland, WA (US); Guang Chao Wang, San Diego, CA (US); Ruixian Liu, San Diego, CA (US); Kenny C. Gross, Escondido, CA (US)

(73) Assignee: Oracle International Corporation, Redwood Shores, CA (US)

( * ) Notice: Subject to any disclaimer, the term of this patent is extended or adjusted under 35 U.S.C. 154(b) by 818 days.

(21) Appl. No.: 18/118,782

(22) Filed: Mar. 8, 2023

(65) Prior Publication Data

US 2024/0303530 A1 Sep. 12, 2024

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS 4,686,655 A 8/1987 Hyatt
7,020,802 B2 3/2006 Gross et al.
7,191,096 B1 3/2007 Gross et al.
7,281,112 B1 10/2007 Gross et al.
7,292,659 B1 11/2007 Gross et al.
7,391,835 B1 6/2008 Gross et al.
(Continued)

FOREIGN PATENT DOCUMENTS

DE 4447288 A1 7/1995

OTHER PUBLICATIONS

NPL Angryk Multivariate time series dataset for space weather data analytics 2020.*

(Continued)

*Primary Examiner* — Paul M Knight
(74) *Attorney, Agent, or Firm* — Kraguljac Law Group LLC

(57) ABSTRACT

Systems, methods, and other embodiments associated with inverse-density exemplar selection for improved multivariate anomaly detection are described. In one embodiment, a method includes determining magnitudes of vectors from a set of time series readings collected from a plurality of sensors. And, the example method includes selecting exemplar vectors from the set of time series readings to train a machine learning model to detect anomalies. The exemplar vectors are selected by repetitively (i) increasing a first density of extreme vectors that are within tails of a distribution of amplitudes for the time series readings based on the magnitudes of vectors, and (ii) decreasing a second density of non-extreme vectors that are within a head of the distribution based on the magnitudes of vectors. The repetition continues until the machine learning model generates residuals within a threshold in order to reduce false or missed detection of the extreme vectors as anomalous.

20 Claims, 8 Drawing Sheets

(56) References Cited

U.S. PATENT DOCUMENTS

| | | | |
|---|---|---|---|
| 7,542,995 | B2 | 6/2009 | Thampy et al. |
| 7,573,952 | B1 | 8/2009 | Thampy et al. |
| 7,613,576 | B2 | 11/2009 | Gross et al. |
| 7,613,580 | B2 | 11/2009 | Gross et al. |
| 7,702,485 | B2 | 4/2010 | Gross et al. |
| 7,869,977 | B2 | 1/2011 | Lewis et al. |
| 8,055,594 | B2 | 11/2011 | Dhanekula et al. |
| 8,069,490 | B2 | 11/2011 | Gross et al. |
| 8,150,655 | B2 | 4/2012 | Dhanekula et al. |
| 8,200,991 | B2 | 6/2012 | Vaidyanathan et al. |
| 8,214,682 | B2 | 7/2012 | Madyanathan et al. |
| 8,275,738 | B2 | 9/2012 | Gross et al. |
| 8,341,759 | B2 | 12/2012 | Gross et al. |
| 8,365,003 | B2 | 1/2013 | Gross et al. |
| 8,457,913 | B2 | 6/2013 | Zwinger et al. |
| 8,543,346 | B2 | 9/2013 | Gross et al. |
| 9,514,213 | B2 | 12/2016 | Wood et al. |
| 9,933,338 | B2 | 4/2018 | Noda et al. |
| 10,015,139 | B2 | 7/2018 | Gross et al. |
| 10,452,510 | B2 | 10/2019 | Gross et al. |
| 10,496,084 | B2 | 12/2019 | Li et al. |
| 10,860,011 | B2 | 12/2020 | Gross et al. |
| 10,929,776 | B2 | 2/2021 | Gross et al. |
| 11,042,428 | B2 | 6/2021 | Gross et al. |
| 11,055,396 | B2 | 7/2021 | Gross et al. |
| 11,255,894 | B2 | 2/2022 | Wetherbee et al. |
| 11,392,786 | B2 | 7/2022 | Gross et al. |
| 2008/0140362 | A1 | 6/2008 | Gross et al. |
| 2008/0252309 | A1 | 10/2008 | Gross et al. |
| 2008/0252441 | A1 | 10/2008 | McElfresh et al. |
| 2008/0256398 | A1 | 10/2008 | Gross et al. |
| 2009/0099830 | A1 | 4/2009 | Gross et al. |
| 2009/0125467 | A1 | 5/2009 | Dhanekula et al. |
| 2009/0306920 | A1 | 12/2009 | Zwinger et al. |
| 2010/0023282 | A1 | 1/2010 | Lewis et al. |
| 2010/0033386 | A1 | 2/2010 | Lewis et al. |
| 2010/0161525 | A1 | 6/2010 | Gross et al. |
| 2010/0305892 | A1 | 12/2010 | Gross et al. |
| 2010/0306165 | A1 | 12/2010 | Gross et al. |
| 2012/0030775 | A1 | 2/2012 | Gross et al. |
| 2016/0098561 | A1 | 4/2016 | Keller, III et al. |
| 2017/0163669 | A1 | 6/2017 | Brown et al. |
| 2018/0349323 | A1* | 12/2018 | Borra .................. G06F 11/3003 |
| 2018/0349797 | A1 | 12/2018 | Garvey et al. |
| 2019/0102718 | A1 | 4/2019 | Agrawal |
| 2019/0163719 | A1 | 5/2019 | Gross et al. |
| 2019/0196892 | A1 | 6/2019 | Matei et al. |
| 2019/0197145 | A1 | 6/2019 | Gross et al. |
| 2019/0237997 | A1 | 8/2019 | Tsujii et al. |
| 2019/0243799 | A1 | 8/2019 | Gross et al. |
| 2019/0286725 | A1 | 9/2019 | Gawlick et al. |
| 2019/0324430 | A1 | 10/2019 | Herzog et al. |
| 2019/0378022 | A1 | 12/2019 | Wang et al. |
| 2020/0125819 | A1 | 4/2020 | Gross et al. |
| 2020/0144204 | A1 | 5/2020 | Keller, III et al. |
| 2020/0201950 | A1 | 6/2020 | Wang et al. |
| 2021/0081573 | A1 | 3/2021 | Gross et al. |
| 2021/0158202 | A1 | 5/2021 | Backlawski et al. |
| 2021/0174248 | A1 | 6/2021 | Wetherbee et al. |
| 2021/0270884 | A1 | 9/2021 | Wetherbee et al. |
| 2022/0121955 | A1 | 4/2022 | Chavoshi et al. |
| 2024/0096067 | A1* | 3/2024 | Mahmud .............. G06V 10/811 |

OTHER PUBLICATIONS

NPL Basu Automatic outlier detection for time series 2006.*

NPL Cao Integrated Oversampling for Imbalanced Time Series 2013.*

NPL Carmona Neural Contextual Anomaly Detection for Time Series 2021.*

NPL Fujiwara Over and Under Sampling Approach 2020.*

NPL Kieu Outlier Detection for Multidimensional Time Series 2018.*

NPL Lai Revisiting Time Series Outlier Detection 2021.*

NPL Li Clustering based anomaly detection in multivariate time series 2021.*

NPL Li Deep learning for anomaly detection 2022.*

NPL Li Detection of Outliers in Time Series Power Data Jan. 2023.*

NPL Mandhare a Comparative Study of Cluster Based Outlier Detection 2017.*

NPL Munir DeepAnT 2019.*

NPL Saripuddin Random Undersampling on Imbalance TS Data for Anomaly Detection 2021.*

NPL Shifaz Elastic Similarity Measures for Multivariate TS Classification 2021.*

NPL Sia Anomaly Detection in Time Series Mar. 2, 2023.*

NPL Tinawi Machine Learning for Time Series Anomaly Detection 2019.*

Bouali Fatma et al. "Visual mining of time series using a tubular visualization," Visual Computer, Springer, Berlin, DE, vol. 32, No. 1, Dec. 5, 2014 (Dec. 5, 2014), pp. 15-30.

Dickey et al.; Checking for Autocorrelation in Regression Residuals; pp. 959-965; Proceedings of 11th Annual SAS Users Group International Conference; 1986.

Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.

Whisnant et al.; "Proactive Fault Monitoring in Enterprise Servers," IEEE—International Multiconference in Computer Science & Computer Engineering (Jun. 27-30, 2005) 11 pgs.

US Nuclear Regulatory Commission; "Technical Review of On-Line Monitoring Techniques for Performance Assessment," vol. 1, Jan. 31, 2006.

Gribok, et al,. "Use of Kernel Based Techniques for Sensor Validation in Nuclear Power Plants," International Topical Meeting on Nuclear Plant Instrumentation, Controls, and Human-Machine Interface Technologies (NPIC & HMIT 2000), Washington, DC, Nov. 2000, pp. 1-15.

Singer, et al., "Model-Based Nuclear Power Plant Monitoring and Fault Detection: Theoretical Foundations," Intelligent System Application to Power Systems (ISAP '97), Jul. 6-10, 1997, Seoul, Korea pp. 60-65.

Wald, A, "Sequential Probability Ratio Test for Reliability Demonstration", John Wiley & Sons, 1947.

Abebe Diro et al.; A Comprehensive Study of Anomaly Detection Schemes in IoT Networks Using Machine Learning Algorithms; pp. 1-13; 2021; downloaded from: https://doi.org/10.3390/s21248320.

Zhenlong Xiao, et al.; Anomalous IoT Sensor Data Detection: An Efficient Approach Enabled by Nonlinear Frequency-Domain Graph Analysis; IEEE Internet of Things Journal, Aug. 2020; pp. 1-11.

Choi Kukjin et al: "Deep Learning for Anomaly Detection in Time-Series Data: Review, Analysis, and Guidelines", IEEE Access, IEEE, USA, vol. 9, Aug. 26, 2021, (23 pgs).

Gross Kenny et al: "AI Decision Support Prognostics for IoT Asset Health Monitoring, Failure Prediction, Time to Failure", 2019 International Conference on Computational Science and Computational Intelligence (CSCI), IEEE, Dec. 5, 2019, pp. 244-248.

Gross, Kenny, Oracle Labs; MSET2 Overview: "Anomaly Detection and Prediction" Oracle Cloud Autonomous Prognostics; p. 1-58; Aug. 8, 2019.

Gross, K. C. et al., "Application of a Model-Based Fault Detection System to Nuclear Plant Signals," downloaded from https://www.researchgate.net/publication/236463759; Conference Paper: May 1, 1997, 5 pages.

* cited by examiner

EXEMPLAR SELECTION ALGORITHM FOR INCREASED DENSITY OF EXTREME VECTORS

BACKGROUND

Machine learning models may be used to detect anomalies in time series readings. Vectors may be selected from time series readings to train the machine learning models to estimate what the time series readings are expected to be.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
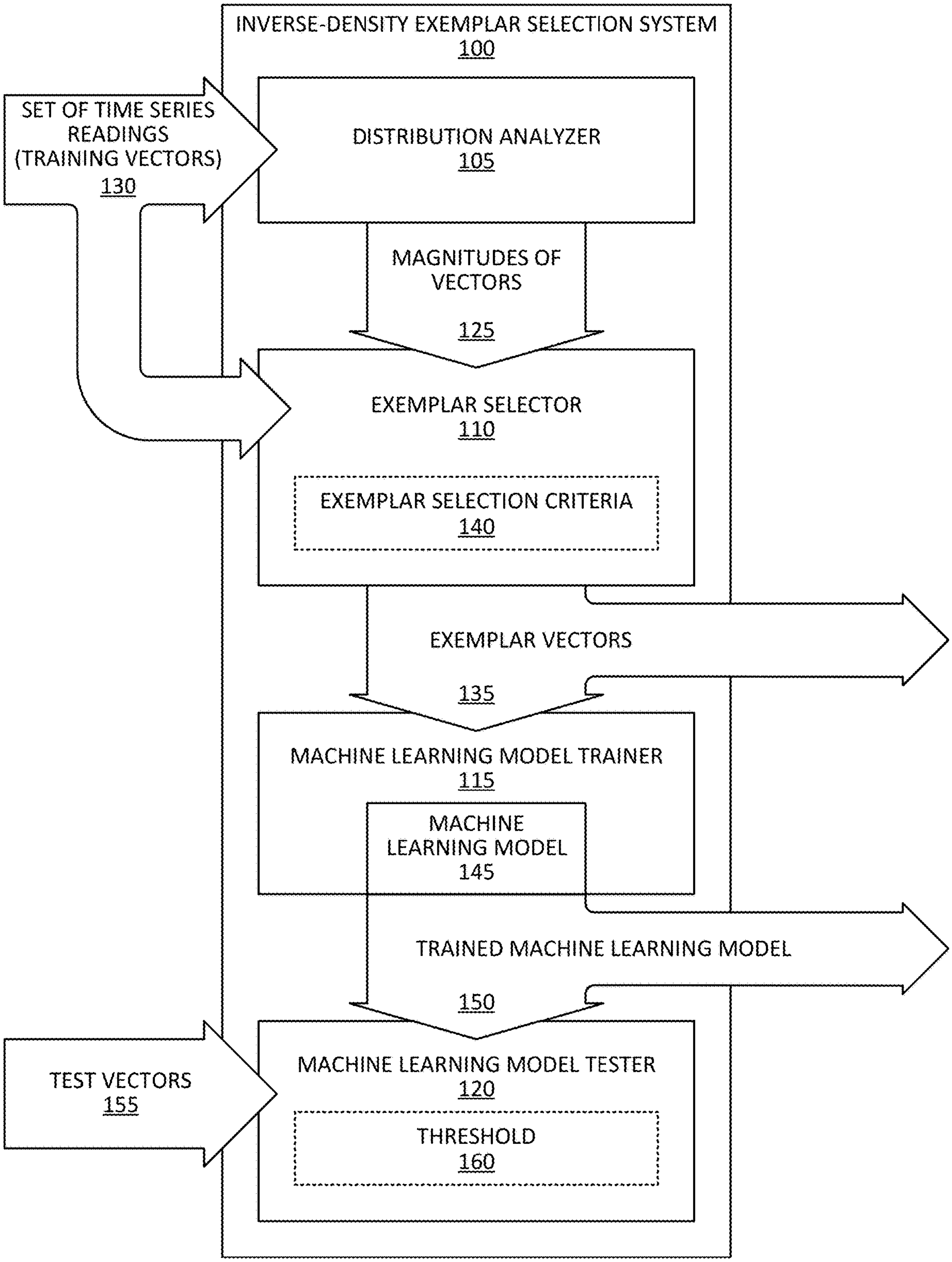
FIG. 1 illustrates one embodiment of an inverse-density exemplar selection system associated with inverse-density exemplar selection for improved multivariate anomaly detection.

Systems, methods, and other embodiments are described herein that provide for inverse-density exemplar selection for improved multivariate anomaly detection. In one embodiment, an inverse-density exemplar selection system selects exemplar vectors for training a machine learning (ML) model to include a larger proportion of exemplar vectors that represent activity of a monitored asset that is "extreme activity," or activity near the edges of a demand distribution (or demand profile) for the monitored asset. This inverts density of exemplar selection, which would otherwise primarily select exemplar vectors that represent "non-extreme activity" near the middle of the demand distribution for the monitored asset.

In one embodiment, an inverse-density exemplar selection system initially finds a distribution of a set of time series readings (vectors) that are available for use in training an ML model. Magnitudes of the time series readings (vectors) that indicate a level or extent of the activity by the monitored asset are then determined. Then, the inverse-density exemplar selection system iteratively selects exemplar vectors for training an ML model so as to include a progressively larger and larger proportion of exemplar vectors that represent extreme activity of a monitored asset. For example, the density of extreme vectors (relatively higher magnitude vectors sampled from the edges or "tails" of the distribution) is incrementally increased in the selection and the density of non-extreme vectors (relatively lower magnitude vectors sampled from the middle or "head" of the distribution) is incrementally decreased until performance of the ML model reaches a satisfactory level. In one embodiment, selecting exemplar vectors as described herein improves the accuracy of anomaly detection by the ML model for extreme activity near edges of the demand profile of the monitored asset. These and other improvements to the technology of exemplar selection and machine learning are discussed in more detail herein.

It should be understood that no action or function described or claimed herein is performed by the human mind, and cannot be practically performed in the human mind. An interpretation that any action or function described or claimed herein can be performed in the human mind is inconsistent with and contrary to this disclosure.

—Definitions—

As used herein, the term "time series" refers to a data structure in which a series of data points (such as observations or sampled values) are indexed in time order. In one embodiment, the data points of a time series may be indexed with an index such as a point in time described by a time stamp and/or an observation number. As used herein, the terms "time series signal" and "time series" are synonymous. For example, a time series is one "column" or sequence of observations over time from one of several sensors used to monitor an asset.

As used herein, the term "vector" refers to a data structure that includes a set of data points (such as observations or sampled values) from multiple time series at one particular point in time, such as a point in time described by a time stamp, observation number, or other index. For example, a "vector" is one row (timestamp) of observations from all N sensors used to monitor an asset.

As used herein, the term "time series database" refers to a data structure that includes one or more time series that share an index (such as a series of points in time, time stamps, time steps, or observation numbers) in common. As an example, time series may be considered "columns" of a time series database, and vectors may be considered "rows" of a time series database.

As used herein, the term "residual" refers to a difference between a value (such as a measured, observed, sampled, or resampled value) and an estimate, reference, or prediction of what the value is expected to be. For example, a residual may be a difference between an actual, observed value and a machine learning (ML) prediction or ML estimate of what the value is expected to be by an ML model. In one embodiment, a time series of residuals or "residual time series" refers to a time series made up of residual values between a time series of values and a time series of what the values are expected to be.

As used herein, the terms "exemplar" or "exemplar vector" refers to a vector used to train a multivariate ML model (such as an ML anomaly detection model). An exemplar vector may also be referred to as a "memory vector."

—Example Inverse-Density Exemplar Selection System—

FIG. 1 illustrates one embodiment of an inverse-density exemplar selection system 100 associated with inverse-density exemplar selection for improved multivariate anomaly detection. Inverse-density exemplar selection system 100 includes components for selecting exemplar vectors from a training set of time series vectors that increases the accuracy of predictions by ML models trained with the selected exemplar vectors for activity of an asset that is near the edges of the demand profile for the asset. In one embodiment, components of inverse-density exemplar selection system 100 may include distribution analyzer 105 and exemplar selector 110. In one embodiment, components of inverse-density exemplar selection system 100 may further include machine learning model trainer 115 and machine learning model tester 120. In one embodiment each of these components 105, 110, 115, and 120 of inverse-density exemplar selection system 100 may be implemented as software executed by computer hardware. For example, components 105, 110, 115, and 120 may be implemented as one or more intercommunicating software modules, routines, or services for performing the functions of the components described herein.

In one embodiment, distribution analyzer 105 is configured to determine magnitudes of vectors 125 by signal amplitudes of the vectors from a set of time series readings 130 collected from a plurality of sensors. In one embodiment, exemplar selector 110 is configured to select exemplar vectors 135 from the set of time series readings 130 to train a machine learning model. Exemplar selector 110 is configured to select the exemplar vectors 135 by repetitively (i) increasing a first density of extreme vectors that are within tails of a distribution of amplitudes for the time series readings 130 based on the magnitudes of vectors 125, and (ii) decreasing a second density of non-extreme vectors that are within a head of the distribution of vectors based on the magnitudes of the vectors 125. In one embodiment, exemplar selection criteria 140 are iteratively adjusted to cause selection of a progressively larger proportion of extreme vectors over multiple iterations of exemplar selection. In one embodiment, the exemplar vectors 135 selected by exemplar selector 110 may be written to memory or storage as an output of inverse-density exemplar selection system 100. Exemplar vectors 135 may then be used to train a machine learning model 145 to detect anomalies in the operation of an asset monitored with the plurality of sensors.

In one embodiment, machine learning model trainer 115 is configured to train the machine learning model 145 to detect anomalies based on the selected exemplar vectors 135. In one embodiment the trained machine learning model 150 resulting from the training of the machine learning model 145 by machine learning model trainer 115 may be written to memory or storage as an output of inverse-density exemplar selection system 100. Trained machine learning model 150 may then be used to generate residuals from vectors supplied as inputs to the trained machine learning model 150.

In one embodiment, machine learning model tester 120 is configured to analyze residuals generated from test vectors 155 by the trained machine learning model 150 to determine whether the residuals are within a threshold 160. In one embodiment, the test vectors 155 are also selected from set of time series readings 130. In one embodiment, whether the residuals are within threshold 160 determines whether the performance of the trained machine learning model 150 is satisfactory with regard to test vectors 155 that are selected from the edges or "tails" of the distribution of the set of time series readings 130, or whether exemplar selection criteria 140 should be further adjusted to increase the proportion of extreme vectors to non-extreme vectors used to train machine learning model 145.

Further details regarding inverse-density exemplar selection system 100 are presented herein. In one embodiment, the operation of inverse-density exemplar selection system 100 will be described with reference to example inverse-density exemplar selection methods 200 and 700 shown in FIGS. 2 and 7, respectively. A challenge resolved by one embodiment of the inverse-density exemplar selection systems and methods described herein will be described with reference to FIGS. 3-6. In one embodiment, an initial filtering operation applied to a training set of vectors (such as set of time series readings 130) will be described with reference to FIGS. 8 and 9. In one embodiment, an analysis of residuals to determine whether performance of a machine learning model trained with exemplar vectors selected in accordance with the inverse-density exemplar selection method has satisfied a threshold is described with reference to FIGS. 10 and 11.

—Example Inverse-Density Exemplar Selection Method—

Figure 2:
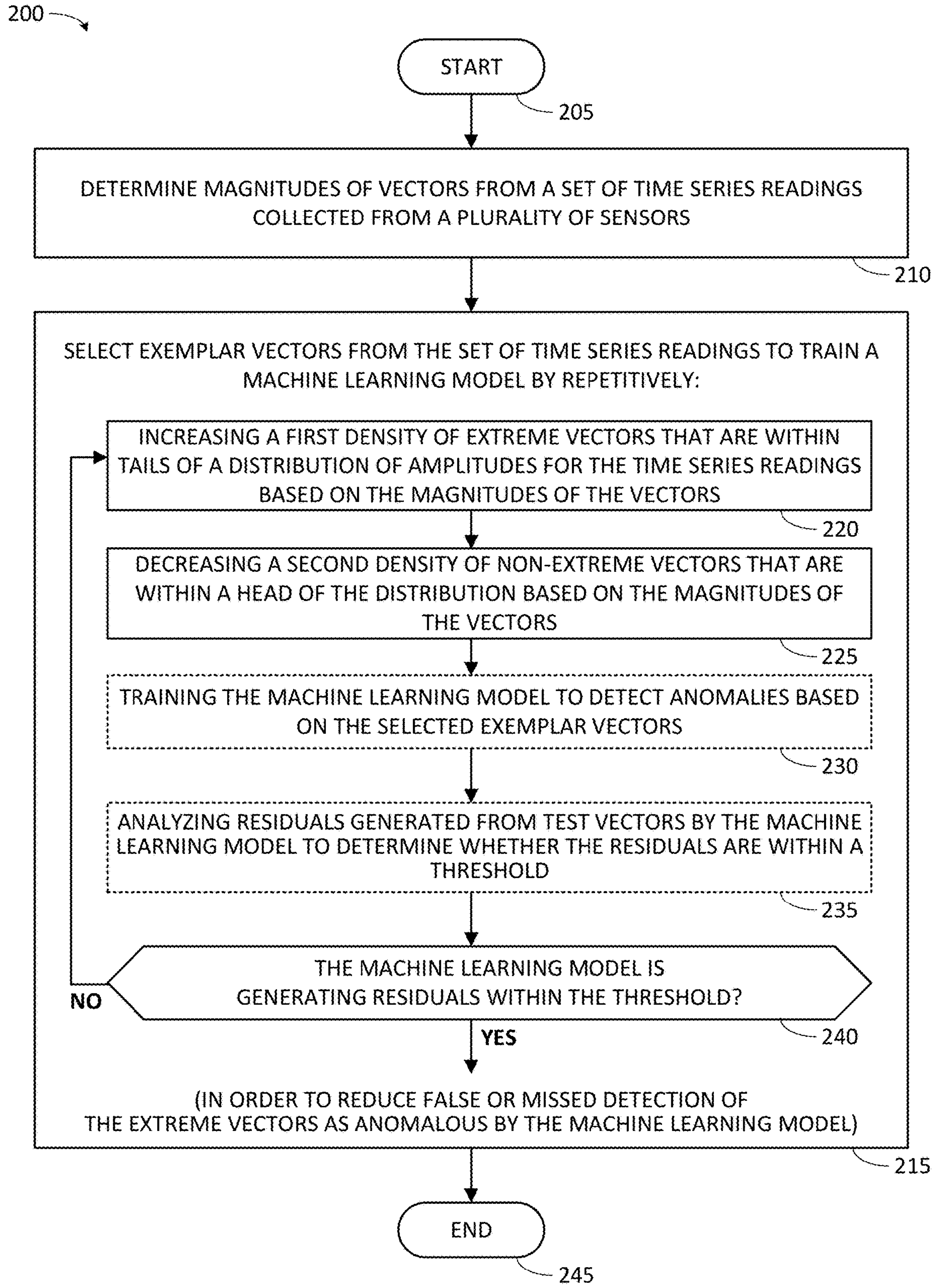
FIG. 2 illustrates one embodiment of an inverse-density exemplar selection method associated with inverse-density exemplar selection for improved multivariate anomaly detection.

FIG. 2 illustrates one embodiment of an inverse-density exemplar selection method 200 associated with inverse-density exemplar selection for improved multivariate anomaly detection. As an overview, in one embodiment, inverse-density exemplar selection method 200 determines magnitudes of vectors from a set of time series readings collected from a plurality of sensors. Then, inverse-density exemplar selection method 200 selects exemplar vectors from the set of time series readings to train a machine learning model by repetitively (1) increasing a first density of extreme vectors (in training data) that are within tails of a distribution of amplitudes for the set of time series readings based on the magnitudes of the vectors and (2) decreasing a second density of non-extreme vectors that are within a head of the distribution based on the magnitudes of the vectors until the machine learning model generates residuals within a threshold. Inverse-density exemplar selection method 200 thus operates to reduce false or missed detection of the extreme vectors (in monitored data) as anomalous by the machine learning model. In one embodiment, inverse-density exemplar selection method 200 selects exemplar vectors from the set of time series readings to train a machine learning model by further (3) training the machine learning model to detect anomalies based on the selected exemplar vectors and (4) analyzing the residuals generated from test vectors by the trained machine learning model to determine whether the residuals are within the threshold.

In one embodiment, inverse-density exemplar selection method 200 initiates at START block 205 in response to an inverse-density exemplar selection system (such as inverse-density exemplar selection system 100) determining one or more of (i) that an inverse-density exemplar selection system has received a set of time series readings; (ii) that an instruction to perform inverse-density exemplar selection method 200 on a set of time series readings has been received (iii) a user or administrator of an inverse-density exemplar selection system has initiated inverse-density exemplar selection method 200; (iv) it is currently a time at which inverse-density exemplar selection method 200 is scheduled to be run; or (v) that inverse-density exemplar selection method 200 should commence in response to occurrence of some other condition. In one embodiment, a computer system configured by computer-executable instructions to execute functions of inverse-density exemplar selection system 100 executes inverse-density exemplar selection method 200. Following initiation at start block 205, inverse-density exemplar selection method 200 continues to process block 210.

—Example Method—Determining Magnitudes of Vectors—

At process block 210, inverse-density exemplar selection method 200 determines magnitudes of vectors from a set of time series readings collected from a plurality of sensors. A magnitude of a vector represents an overall level of intensity of operation for an asset at the time represented by the vector. Vectors representing operation at extremes (low, high) of a distribution of levels of intensity of operation for the asset may be distinguished from vectors representing operation at non-extremes (moderate) of the distribution of levels of intensity of operation for the asset based on the magnitude.

In one embodiment, the inverse-density exemplar selection method 200 receives, retrieves, obtains, or otherwise acquires a set of time series readings. Readings are values of output for a sensor at a given point in time. In one embodiment, the time series readings are collected from the plurality of sensors by recording or sampling values that are output by the plurality of sensors at an interval of time. An individual sensor is sampled to produce a time series signal of sampled values or readings associated with that sensor over a range of time. Thus, the plurality of sensors produces a plurality of time series signals.

A time series vector for a point in time includes a sampled value for the point in time for each of the time series signals. In one embodiment, the set of time series readings is a time series database. The set of time series readings may include time series signals of sensed values for a plurality of sensors over time. And, the set of time series readings may be a sequence of vectors of readings across the signals for a plurality of sensors at an individual point in time. In one embodiment, a point in time of an individual training vector in the set of time series readings is discrete from the points in time of other training vectors in the set of time series readings. In other words, the individual training vectors in the set of time series readings occur at different points in time.

In one embodiment, the set of time series readings may be a collection of time series vectors that are made available for use to train an ML anomaly detection model. The time series vectors in the set of time series readings may also be referred to herein as training vectors. The set of time series readings may include a quantity N of training vectors. Thus, in one embodiment, a set of N available training vectors are acquired.

In one embodiment, a vector represents operational characteristics of an asset at one point in time. The vector represents the operation of the asset in a multivariate hyperspace of values of amplitude sampled for each of the sensors. In one embodiment, a magnitude of a vector represents an overall extent of operation of the asset. In other words, the magnitude of a vector represents a level of intensity of operation of an asset at a time point for the vector.

In one embodiment, the magnitude is measured by distance from an origin in the multivariate hyperspace defined by the values in the vector for the sensors. In other words, the magnitude of a vector represents a distance between an origin or reference point and a point plotted by the vector in a multivariate hyperspace. For example, this distance may be referred to as the L2 norm or Euclidean distance. The L2 norm of a vector is the square root of the sum of the squares of the values in the vector for the sensors. Formally, the L2 norm $|v|_2$ of a vector $v=(v_1, \ldots, v_n)$ is given by $$|v|_2 = \sqrt{v_1^2 + \ldots + v_n^2}.$$

Thus, in one embodiment, the magnitudes of the training vectors in the set of time series are determined by finding the L2 norms of the training vectors. The L2 norms of the training vectors are used as the magnitudes of the training vectors. To generate the magnitude (L2 norm) of a training vector, the square root of the sum of the squares of the signal amplitude values in the training vector is calculated.

Thus, in one embodiment, inverse-density exemplar selection method 200 determines magnitudes of vectors from a set of time series readings collected from a plurality of sensors by obtaining a set of time series readings from the plurality of sensors, determining the signal values of the training vectors in the set of time series readings, and generating the magnitudes of the vectors from the signal values of the training vectors (for example by calculating the L2 norms of each training vector to be the magnitudes). Process block 210 then completes, and inverse-density exemplar selection method 200 continues at process block 215. In one embodiment, the functions of process block 210 are performed by distribution analyzer 105 of inverse-density exemplar selection system 100.

—Example Method—Exemplar Selection Loop—

At process block 215, inverse-density exemplar selection method 200 selects exemplar vectors from the set of time series readings to train a machine learning model. In one embodiment, the exemplar vectors are selected by repeatedly iterating through steps of an exemplar selection loop. In one embodiment, the exemplar selection loop includes steps for increasing a first density of extreme vectors that are within tails of the distribution; decreasing a second density of non-extreme vectors that are within a head of the distribution; training the machine learning model to detect anomalies based on the selected exemplar vectors; and analyzing residuals generated from test vectors by the trained machine learning model to determine whether the residuals are within a threshold.

A specific quantity (numVecs) of the training vectors are selected to be exemplar vectors at each iteration of the exemplar selection loop. In the exemplar selection loop, a density of extreme vectors—those vectors having magnitudes in either the high or low extremes of the distribution of magnitudes of training vectors in the set of time series readings—is increased in the quantity of selected exemplar vectors. And, in the exemplar selection loop, a density of non-extreme vectors—those vectors having vectors in the middle of the distribution of magnitudes of training vectors in the set of time series readings—is decreased in the quantity of selected exemplar vectors. The exemplar selection loop repeats until the machine learning model generates the residuals within the threshold. Performing the exemplar selection loop reduces false or missed detection of extreme vectors as anomalous by the machine learning model.

As mentioned above, exemplar vectors are training vectors that are chosen to be used to train the machine learning model. In one embodiment, the exemplar vectors are selected from the set of time series readings by choosing training vectors to be exemplar vectors. For example, training vectors are selected to be exemplar vectors based on selection criteria. Additional detail regarding the selection criteria is discussed below, for example with reference to process blocks 710, 745, 750, 755, and 760 of method 700. In one embodiment, the machine learning model is a multivariate ML anomaly detection model, for example as discussed below under the heading "Multivariate ML Anomaly Detection."

Inverse-density exemplar selection method 200 continues at process block 220. In one embodiment, the functions of process block 215 are performed by one or more of exemplar selector 110, machine learning model trainer 115, and machine learning model tester 120 of inverse density selection system 100.

Initially, exemplar vectors are selected from the time series readings that have a given density of extreme vectors and a given density of non-extreme vectors (as discussed in additional detail at process blocks 220 and 225 below). The extreme vectors are vectors within tails of a distribution of amplitudes for the time series readings based on the magnitudes of the vectors. The non-extreme vectors are vectors within a head of the distribution of amplitudes based on the magnitude of the vectors.

—Example Method—Increased Extreme Vector Selection—

At process block 220, inverse-density exemplar selection method 200 increases a first density of extreme vectors that are within tails of the distribution.

In one embodiment, training vectors that are extreme are selected with heightened preferentiality relative to training vectors that are non-extreme during exemplar selection. The preference for extreme training vectors is increased in selection criteria for each iteration of process block 220 during the exemplar selection loop. Whether a training vector is extreme and falls within the tails of a distribution may be determined based on the magnitude of the training vector.

The set of time series readings includes both extreme and non-extreme vectors. In one embodiment, extreme vectors are those vectors that are highest in magnitude. Thus, vectors become progressively less extreme starting from a vector of greatest magnitude and moving downward in magnitude. In one embodiment, non-extreme vectors are those vectors that that are least in magnitude. Thus, vectors become progressively more extreme starting from a vector of least magnitude and moving upward in magnitude.

In one embodiment, a distribution of the training vectors that are present in the set of time series readings may be represented by a histogram of amplitude values for the training vectors. The histogram represents how often training vectors having given signal amplitudes occur in the set of time series readings. In one embodiment, the histogram is multidimensional in order to represent the values of amplitude for multiple sensors included in a training vector.

In one embodiment, references to the head, tails, or other position of a vector in "the distribution" refers to a position of the vector within the histogram. For example, a vector that is "within a head of the distribution" is, in one embodiment, a vector that has amplitude values that occur within a head of a histogram of amplitude values of the training vectors. Or, for example, a vector that is "within tails of the distribution" is, in one embodiment, a vector that has amplitude values that occur within one of the high or low tails of the histogram of amplitude values of the training vectors. Thus, in one embodiment, the distribution of the vectors is determined based on the signal amplitudes of the vectors. The distribution shows the relationship between the training vectors in the set of time series readings with respect to signal amplitudes of the training vector.

In one embodiment, the distribution of the training vectors (in terms of signal amplitude) is approximately bell-shaped or Gaussian in the multivariate hyperspace. Thus, the distribution of the training vectors has a thick "head" at the interior or middle of the distribution, which tapers to a thin "tail" at the exterior or extremes of the distribution. Vectors of signal values for moderate operation of an asset occur at the middle or interior of the distribution. The head indicates that there are more vectors with signal values for moderate operation of the asset. Vectors of signal values for extreme (low or high) operation of an asset occur at the edges or extremes of the distribution. The tail indicates that there are fewer vectors with signal values for extreme operation of the asset.

Extreme vectors that occur within the tails of the distribution have relatively larger magnitudes. Non-extreme vectors that occur within the head of the distribution have relatively smaller magnitudes. Thus, selections of higher proportions of extreme vectors and lower proportions of non-extreme vectors may be performed based on magnitude of vectors.

In one embodiment, density of a type of vector (such as extreme or non-extreme) in a set of exemplar vectors refers to a concentration or density of vectors of that type in the set of exemplar vectors. In one embodiment, a density of extreme vectors may be increased in a set of exemplar vectors by selecting more of the extreme vectors. To select more of the extreme vectors and thereby increase the density of extreme vectors, more of the training vectors that have higher magnitudes should be selected to be exemplar vectors. In other words, training vectors with high magnitudes should be more preferentially selected to be exemplar vectors. Thus, training vectors that have higher magnitudes (that are associated with extreme vectors) are selected with heightened preferentiality relative to training vectors that have lower magnitudes (that are associated with non-extreme vectors) during exemplar selection.

In one embodiment, an increased number of training vectors with higher magnitudes may be selected by adjusting or changing a selection criteria to favor selection of training vectors with higher magnitudes. The selection criteria may be adjusted or changed incrementally to increase a preference for higher magnitude training vectors until all of the highest magnitude training vectors are selected to be exemplars. Additional detail on selection criteria for choosing exemplar vectors from the training vectors is provided below, for example with reference to process blocks 710, 745, 750, 755, and 760 of method 700.

In one embodiment, inverse-density exemplar selection method 200 retrieves or otherwise accesses the magnitudes of the training vectors that occur in the set of time series readings. Inverse-density exemplar selection method 200 also accesses an exemplar selection criteria. The exemplar selection criteria describes an extent to which vectors of higher magnitude (extreme vectors) are preferred over vectors of lower magnitude (non-extreme vectors). Inverse-density exemplar selection method 200 then selects the quantity (numVecs) of exemplar vectors from the training vectors in accordance with the exemplar selection criteria. In one embodiment, selected exemplars are copied to a set of exemplar vectors. In one embodiment, selected exemplars are labeled as exemplars in the set of time series readings. In one embodiment, the selected exemplars are written out to storage for subsequent use in training of machine learning models.

In one embodiment, at an initial iteration of an exemplar selection loop, the selected exemplars have a greater average magnitude than a random selection of exemplars without regard to magnitude. At subsequent iterations of the exemplar selection loop, the average magnitude of the selected exemplars increases in each iteration.

Process block 220 then completes, and inverse-density exemplar selection method 200 continues at process block 225. In one embodiment, the functions of process block 220 are performed by exemplar selector 110 of inverse-density exemplar selection system 100. At the conclusion of process block 220, the density of extreme vectors in the selected exemplars has been increased.

—Example Method—Decreased Non-Extreme Vector Selection—

At process block 225, inverse-density exemplar selection method 200 decreases a second density of non-extreme vectors that are within a head of the distribution. In one embodiment, training vectors that are non-extreme are selected with reduced preferentiality relative to training vectors that are extreme during exemplar selection. The aversion to (that is, preference against) non-extreme training vectors is increased in selection criteria for each iteration of process block 225 during the exemplar selection loop. Whether a training vector is non-extreme and falls within the head of a distribution may be determined based on the magnitude of the training vector.

In one embodiment, a density of non-extreme vectors may be decreased in a set of exemplar vectors by selecting fewer of the non-extreme vectors. To select fewer of the non-extreme vectors and thereby decrease the density of extreme vectors, fewer of the training vectors that have lower magnitudes should be selected to be exemplar vectors. In other words, training vectors with low magnitudes should be less preferentially selected to be exemplar vectors. Thus, training vectors that have lower magnitudes (that are associated with non-extreme vectors) are selected with reduced preferentiality relative to training vectors that have higher magnitudes (that are associated with extreme vectors) during exemplar selection.

In one embodiment, a decreased number of training vectors with lower magnitudes may be selected by adjusting or changing a selection criteria to favor selection of training vectors with higher magnitudes, as discussed with reference to process block 220 above, and further with reference to process blocks 710, 745, 750, 755, and 760 of method 700 below. In one embodiment decreasing the density of non-extreme vectors that are within the head of the distribution is performed contemporaneously and in a shared process with increasing the density of extreme vectors that are within the tails of the distribution discussed at process block 220 above. Thus, as discussed above, in one embodiment, inverse-density exemplar selection method 200 accesses the magnitudes of the training vectors that occur in the set of time series readings and also accesses the exemplar selection criteria, and selects the quantity (numVecs) exemplars in accordance with the exemplar selection criteria.

Process block 225 then completes, and inverse-density exemplar selection method 200 continues at process block 230. In one embodiment, the functions of process block 225 are performed by exemplar selector 110 of inverse-density exemplar selection system 100. At the conclusion of process block 225, the density of non-extreme vectors in the selected exemplars has been decreased.

—Example Method—Training ML Model Using Selected Exemplar Vectors—

At process block 230, inverse-density exemplar selection method 200 trains the machine learning model to detect anomalies based on the selected exemplar vectors. The machine learning model is trained to predict what signal amplitude values in vectors are expected to be based on the exemplar vectors. In one embodiment, the machine learning model is a ML anomaly detection model.

In one embodiment, inverse-density exemplar selection method 200 accesses the exemplar vectors that were selected above and retrieves, loads, or obtains a machine learning model (for example, an untrained machine learning model) for training. To train the machine learning model, inverse-density exemplar selection method 200 adjusts a configuration of the machine learning model based on the exemplar vectors that have been selected to have increased density of extreme vectors, and decreased density of non-extreme vectors. The adjustments cause the model to produce estimated amplitude values for signals of a vector based on actual signal amplitude values for other signals of the vector. Where actual signal amplitude values differ from estimated signal values by too great a residual, an anomaly will be detected by a detector (for example, a detector based upon a sequential probability ratio test) that is monitoring a sequence of magnitudes of residuals between the estimated and actual values. The trained machine learning model that has been trained with the selected exemplars may be stored for subsequent use. In one embodiment, the trained machine learning model that has been trained with the selected exemplars may be used to detect anomalies with greater accuracy (that is, with fewer false and missed detection of anomalies) for extreme readings than a machine learning model trained with other vectors.

Additional detail on training the machine learning model to detect anomalies based on the selected exemplar vectors is provided below, for example under the heading "Multivariate ML Anomaly Detection".

Process block 230 then completes, and inverse-density exemplar selection method 200 continues at process block 235. In one embodiment, the functions of process block 230 are performed by machine learning model trainer 115 of inverse-density exemplar selection system 100. At the conclusion of process block 230, a machine learning model has been trained to detect anomalies based on the selected exemplars. The trained machine learning model may be used to determine whether training using the selected exemplar vectors satisfactorily reduces false or missed detection of extreme vectors as anomalous.

—Example Method—Analysis of ML Model Trained Using Selected Exemplars—

At process block 235, inverse-density exemplar selection method 200 analyzes residuals generated from test vectors by the trained machine learning model to determine whether the residuals are within a threshold. In one embodiment, inverse-density exemplar selection method 200 tests the machine learning model that has been trained with the selected exemplar vectors to determine whether the machine learning model generates residuals within the threshold. The trained machine learning model is operated and the results examined to see if training using the selected exemplar vectors satisfactorily reduces false or missed detection of extreme vectors as anomalous.

In one embodiment, the trained machine learning model is retrieved or otherwise accessed. Inverse-density exemplar selection method 200 then tests the trained machine learning model. For example, the trained machine learning model is executed to generate estimates from test vectors. In one embodiment, the test vectors are a set of vectors other than the selected exemplar vectors. In one embodiment, the test vectors may also be selected from the set of test vectors. In one embodiment, the test vectors may be drawn from an additional set of time series readings from the sensors. The machine learning model produces estimates for the signal amplitude values of the test vectors based on the training using the selected exemplars. Inverse-density exemplar selection method 200 then generates residuals from the estimates produced by the machine learning model during testing. For example, the machine learning model generates residuals by calculating the differences between actual and estimated signal amplitude values for the test vectors.

In one embodiment, the residuals are then analyzed to determine whether the residuals are within (or satisfy) a threshold. The threshold indicates whether or not training using the selected exemplar vectors satisfactorily reduces false or missed detection of extreme vectors as anomalous. In one embodiment, the analysis is a graphical analysis of the residuals in relation to corresponding (in terms of variable or sensor) actual values of signal amplitude in the test vectors. In one embodiment, the analysis includes plotting absolute values of the residuals against the actual values; filtering the plotted residuals using inverse lensing filtering to reduce the quantity of plotted residuals in the plot; fitting a curve (such as a spline curve) to the plotted, filtered residuals; generating a mean cumulative function of residual values that are on the fitted curve; generating a numerical derivative of the mean cumulative function; determining a ratio between a maximum and minimum value of the numerical derivative; and determining whether the ratio satisfies the threshold. Where the ratio satisfies the threshold, the residuals are within (or satisfy) the threshold, indicating that accuracy of the trained machine learning model is consistent between extreme test vectors that are selected from the tails of the distribution and non-extreme test vectors that are selected from the head of the distribution. Where accuracy of the machine learning model is consistent between extreme and non-extreme test vectors, the selected exemplar vectors satisfactorily train the machine learning model in a way that reduces false or missed detection of extreme vectors as anomalous. Additional detail regarding the analysis of the residuals is described below with reference to blocks 725-735 of method 700.

Process block 235 then completes, and inverse-density exemplar selection method 200 continues at decision block 240. In one embodiment, the functions of process block 235 are performed by machine learning model tester 120 of inverse-density exemplar selection system 100. At the conclusion of process block 235, a machine learning model trained using the selected exemplar vectors has been analyzed to determine whether residuals generated by the trained machine learning model satisfy a threshold for consistency between residuals for extreme vectors and residuals for non-extreme vectors. Satisfying the threshold indicates that the selected exemplars result in a machine learning model with sufficiently reduced false or missed detection of extreme vectors as anomalous.

At decision block 240, inverse-density exemplar selection method 200 determines whether the machine learning model is generating residuals that satisfy the threshold or not. Where the machine learning model is generating residuals that do not satisfy the threshold (decision block 240:NO), processing returns to process block 220 for another iteration of the exemplar selection loop in which the density of extreme vectors is further increased. Where the machine learning model is generating residuals that do satisfy the threshold (decision block 240:YES), the density of extreme vectors is sufficient for satisfactory performance of the machine learning model, and processing continues to END block 245, where inverse-density exemplar selection method 200 concludes. Thus, in one embodiment, the increasing (process block 220), decreasing (process block 225), training (process block 230), and analysis (process block 235) steps are repeated or performed repetitively until the machine learning model generates residuals within the threshold.

—Further Embodiments of Inverse-Density Exemplar Selection Method—

In one embodiment, the exemplar selection loop discussed above with reference to process block 215 includes steps for training an ML anomaly detection model with the selected exemplar vectors, testing the ML anomaly detection model with additional training vectors, and determining whether residuals resulting from the testing indicate the ML anomaly detection model was trained with a sufficient density of extreme vectors. In one embodiment, inverse-density exemplar selection method 200 includes repetitively training the machine learning model with the selected exemplar vectors (for example as described above at process block 230). In one embodiment, inverse-density exemplar selection method 200 also includes repetitively generating the residuals with the trained machine learning model for test vectors selected from the set of time series readings (for example as described above at process block 235). And, in one embodiment, inverse-density exemplar selection method 200 also includes repetitively analyzing the residuals to determine whether the residuals are within the threshold (for example as described above at process block 235). Thus, the increasing, decreasing, training, and analysis steps may be repeated until the machine learning model generates residuals that satisfy the threshold. The threshold has a pre-set value that indicates that accuracy of the trained machine learning model is consistent between the test vectors that are selected from the tails of the distribution and the test vectors that are selected from the head of the distribution. Additional detail on the threshold is discussed below with reference to process block 725-735 of method 700.

In one embodiment, analyzing residuals to determine whether they are within or satisfy a threshold (as discussed above at process block 235) includes a graphical analysis of the residuals. Thus, in one embodiment, analyzing the residuals to determine whether the residuals are within the threshold includes generating a plot of the residuals against corresponding actual values for which the residuals were generated. The analysis of the residuals then fits a spline curve to the plot of the residuals. In one embodiment, fitting the spline curve generates fitted (or interpolated) residuals on the spline curve. The analysis of the residuals generates a mean cumulative function of fitted residuals that are on the spline curve. In one example, the analysis of the residuals generates the mean cumulative function of the fitted residuals that are included on the spline curve by the fitting of the spline curve. The analysis of the residuals then generates a derivative of the mean cumulative function. The analysis of the residuals then finds a maximum value of the derivative of the mean cumulative function and a minimum value of the derivative of the mean cumulative function. The analysis of the residuals then determines whether a ratio of the maximum value to the minimum value is below the pre-set value to determine whether the residuals are within the threshold. Additional details regarding analyzing residuals to determine whether they are within or satisfy a threshold are discussed below with reference to blocks 725-735 of method 700.

In one embodiment, the residuals are filtered to reduce the quantity of plotted residuals in the plot. In one embodiment, the residuals are filtered with an inverse lensing filtering process. In one embodiment, a first quantity or density of residuals in a zone at or near a middle or a mean of the plot is reduced significantly, and a second quantity or density of residuals in a zone at or near edges of the plot is reduced little if at all. Additional gradations of an extent of filtering may occur between the middle and edge zones, as discussed below. Thus, in one embodiment, inverse-density exemplar selection method 200 includes filtering the residuals to reduce the number of the residuals in the plot by a greater extent at the middle of the plot and by a lesser extent at an edge of the plot. In one embodiment, the filtering is performed before fitting the spline curve to the plot of the residuals. The inverse lensing filtering operates to reduce the residuals in the plot that are from vectors that are within the head of the distribution by a greater extent, and to reduce the residuals in the plot that are from vectors that are within the tails of the distribution by a lesser extent. The analysis of the residuals may thus be further focused on the effect of extreme vectors. Additional detail regarding inverse lensing filtering is discussed below with reference to process block 730 of method 700.

In one embodiment, the magnitudes of the training vectors are the L2 norms of the training vectors, as discussed above at process block 210. An L2 norm for a vector is determined from the component data points of the vector. Therefore, in one embodiment, inverse-density exemplar selection method 200 determines the magnitudes of the vectors from the set of time series readings by calculating the L2 norms of the vectors. And, the magnitudes of the vectors are the L2 norms of the vectors. Selection of exemplar vectors may be performed based on the L2 norm (that is, the magnitude of the vector), for example as discussed below with reference to process blocks 710, 745, 750, 755, and 760 of method 700. In one embodiment,?

In one embodiment, selection criteria for selecting exemplar vectors (at process block 215) are iteratively adjusted to cause progressively more dense concentrations of extreme vectors (that is, vectors having magnitudes in the extremes of the distribution of the set of time series readings) to be selected from the set of time series readings. In one embodiment, inverse-density exemplar selection method 200 iteratively selects a progressively larger proportion of extreme vectors to be included in the exemplar vectors.

For example, in one embodiment, selecting the exemplar vectors (at process block 215) includes in a first (or initial) iteration, selecting a first set of vectors that are lowest ranked by magnitude and that have both even-numbered indexes and odd-numbered indexes to be the exemplar vectors (for example as described with reference to process block 710 of method 700). Selecting the exemplar vectors also includes selecting incrementally more of the extreme vectors than in the first iteration by, in a second iteration, selecting a second set of vectors that are lowest ranked by magnitude and that have one of either even-numbered indexes or odd-numbered indexes to be the exemplar vectors (for example as described with reference to process block 745 of method 700). Selecting the exemplar vectors also includes selecting incrementally more of the extreme vectors than in the second iteration by, in a third iteration, selecting a third set of vectors that are in a middle range of magnitude and that have one of either even-numbered indexes or odd-numbered indexes to be the exemplar vectors (for example as described with reference to process block 750 of method 700). Selecting the exemplar vectors also includes selecting incrementally more of the extreme vectors than in the third iteration by, in a fourth iteration, selecting a fourth set of vectors that are highest ranked by magnitude and that have one of either even-numbered indexes or odd-numbered indexes to be the exemplar vectors (for example as described with reference to process block 755 of method 700). And, selecting the exemplar vectors further includes selecting incrementally more of the extreme vectors than in the fourth iteration by, in a fifth iteration, selecting a fifth set of vectors that are highest ranked by magnitude and that have both even-numbered indexes and odd-numbered indexes to be the exemplar vectors (for example as described with reference to process block 760 of method 700).

In one embodiment, the density of extreme vectors is increased, and the density of non-extreme vectors is decreased by re-selecting the extreme vectors in a way that gathers progressively more extreme vectors and progressively fewer non-extreme vectors. Therefore, in one embodiment, increasing the first density of the extreme vectors that are within the tails of the distribution (at process block 220) and decreasing the second density of the non-extreme vectors that are within the head of the distribution (at process block 225) further comprises selecting a progressively larger proportion of extreme vectors to be included in the exemplar vectors. Selection of a progressively lager proportion of extreme vectors is discussed in additional below with reference to method 700.

In one embodiment, the threshold is pre-set or pre-provided (for example by a user or administrator) to have the accuracy of the trained ML anomaly detection model be sufficiently similar at both the head (middle) and tails (extremes) of the distribution of asset operation (as measured by vector magnitude). Therefore, in one embodiment, the threshold has a pre-set value that indicates that accuracy of the trained machine learning model is consistent between the test vectors that are selected from the tails of the distribution and the test vectors that are selected from the head of the distribution. For example, a threshold ratio of a maximum of a numerical derivative of the mean cumulative function to a minimum of the numerical derivative of the mean cumulative function may be stored. Additional detail on the threshold is provided below with regard to decision block 735 of method 700.

In one embodiment, inverse-density exemplar selection method 200 monitors a second set of time series readings from an asset under surveillance for anomalous activity using the trained ML anomaly detection model. And, in response to detecting an anomaly during the monitoring, inverse-density exemplar selection method 200 generates an electronic alert that anomalous activity has been detected. Additional detail on monitoring vectors of signal values in the second set of time series readings for anomalies and generating alerts is provided below under the heading "Multivariate ML Anomaly Detection."

In one embodiment, a non-transitory computer-readable medium may include stored thereon computer-executable instructions that when executed by at least a processor of a computer cause the computer to execute method steps for selection of extreme vectors to be exemplars for training a machine learning model (such as an ML anomaly detection model), such as the steps of inverse-density exemplar selection method 200 or iterative exemplar vector reselection method 700. In one embodiment, a computing system may include at least a processor, a memory operably connected to the processor, and a non-transitory computer-readable medium operably connected to the processor and memory and storing computer-executable instructions. When executed by at least the processor accessing memory, the instructions cause the computing system to execute method steps for selecting extreme vectors to be exemplars for training a machine learning model, such as the steps of inverse-density exemplar selection method 200 or iterative exemplar vector reselection method 700.

—Discussion and Additional Embodiments—

Machine learning (ML) algorithms for multivariate anomaly detection (also referred to as ML anomaly detection models) monitor time series signals from assets deployed in a variety of industries to detect the onset of anomalous patterns in signals. Such detection enables predictive and prescriptive analytics. Discovery of incipience or onset of subtle developing anomalies allows the underlying faults to be fixed before assets suffer expensive and possibly catastrophic failure events. In general, ML algorithms for multivariate anomaly detection ML are trained on training data that is obtained from the asset when the asset is undegraded. Exemplars are "training vectors" that are selected from the Training Data and used to train the ML algorithm.

ML anomaly detection models consume and process collections of multivariate time series (such as time series databases) from sensors, such as Internet of things (IoT) or other network-connected sensors. The size of collections of multivariate time series have been growing both in terms of numbers of sensors and in terms of sampling rates. For example, a single commercial airliner may have over 75,000 sensors, a modern oil refinery or a moderately-sized data center may each have over one million sensors, and these sensors may be sampled at millisecond or finer intervals. Sensor counts have therefore grown exponentially for sensor-monitored assets, and also sensor sampling rates have grown at least linearly over the years as sensors and associated data acquisition systems have become more capable and more inexpensive.

In general, an ML anomaly detection model is trained to produce estimates of what the values of input variables should be based on training with time series signals of sensor readings that represent normal or correct operation of a monitored asset. The time series signals used to train the ML anomaly detection model thus does not represent degraded, abnormal or incorrect operation of the monitored asset. That is, ML anomaly detection models are trained with sensor signals from a "good" asset.

Were an ML anomaly detection model trained on data that includes degraded or anomalous activity (as a simple example, training the model on a 6-cylinder automobile that has a spark-plug problem and is only running 5 cylinders), then the ML anomaly detection model will not detect such anomalous activity during surveillance. Or, if the ML anomaly detection model trained on data that includes anomalous activity, repairing the monitored asset will result in normal operation being flagged as anomalous. (In the simple example presented, if the defective sparkplug starts working or is replaced, operation with all 6 cylinders will be flagged as anomalous by an ML anomaly detection model trained on 5-cylinder operation.)

For training signals from an undegraded asset, one could theoretically use 100% of the vectors (rows of values from each sensor) as exemplars for training the ML anomaly detection model. However, as the number of sensors has grown, this practice of training with 100% of the exemplars has become computationally intractable. Hence the training data may be down-selected or down-sampled to retain a subset of the vectors in the training data as exemplars, and discard others. For example, one method of down-sampling includes simply selecting 1 out of every so many vectors (such as one out of 25 or 50 vectors) to use as exemplars. In general, down-sampling exemplar selection substantially reduces the compute burden of training the ML anomaly detection model with little loss in accuracy of anomaly detection.

But, down-sampling exemplar selection has been found to create a challenge in which the ML anomaly detection model provides more accurate prognostics for asset operation near the middle or "head" of a bell-shaped distribution of asset operation, and less accurate prognostics near the extrema or thin "tails" of the bell-shaped distribution of asset operation. In other words, ML anomaly detection models are predicting better (with smaller residuals) for moderate operation of assets, and worse (with larger residuals) for maximal and minimal operation of assets. Hence, there is higher probability of detecting anomalies and with lower false-alarm probabilities (FAPs) and missed alarm probabilities (MAPs) when signals are in a moderate-demand middle of the distribution of asset operation, and lower probability of detecting anomalies and with somewhat higher false-alarm and missed alarm probabilities when signals are near the low-demand and high-demand extrema of the distribution of asset operation.

Returning again to the example of the automobile, down-sampling exemplar selection can cause an ML anomaly detection model to provide higher prognostic accuracy (with lower false alarm and missed alarm probabilities) when the automobile is driving at a moderate speed of 20-35 miles per hour, and lower prognostic accuracy (with higher false alarm and missed alarm probabilities) when the automobile is idling, or when the automobile is moving at freeway speeds. It is undesirable for an ML anomaly detection model to lose anomaly detection performance when an asset is operated in a low-demand range or high-demand range outside of a moderate-demand range.

The underlying root cause of the loss of performance of the ML anomaly detection model towards the edges of the demand profiles for the assets is that vector selection algorithms for choosing exemplars select far more exemplars from the crowded "head," "hump," interior, or middle of the bell-shaped distributions of asset operation, and select too few exemplars from the sparser "thin tails," exterior, or extremes of the bell-shaped distributions of asset operation. In other words, naïve exemplar selection processes choose too few vectors that represent extreme operation (either at a high or low level), and too many vectors that represent moderate operation of an asset.

In one embodiment, as discussed above, a novel inverse-density exemplar selection algorithm is presented for systematically selecting fewer exemplar vectors from the middle where the distribution of training vectors is denser, and more exemplar vectors from the exterior where the training vectors are sparser. For example, inverse-density exemplar selection algorithm iteratively shifts exemplar selection from the middle or interior of the distribution of asset operation to the exterior of the distribution until the exemplars will result in satisfactory ML model performance. Thus, the inverse-density exemplar selection algorithm systematically decreases the density of Exemplars near the "middle" (in the multivariate vector hyperspace) of the training data distribution, and systematically increases the density of exemplars near the "thin tail" extrema of the distributions.

In one embodiment, inverse-density exemplar selection as taught herein has been shown experimentally to result in higher prognostic performance for an ML algorithm trained on the selected exemplar vectors. In particular, for example, the improved prognostic performance includes earlier detection of incipient anomalies, and reduced false-alarm and missed-alarm probabilities. In one embodiment, inverse-density exemplar selection systems and methods as described herein retain the compute cost advantage of down-selecting exemplars from the available universe of possible exemplars, and further improves overall prognostic performance for the ML anomaly detection model for earlier detection of incipient anomalies with lower FAPs and MAPs.

—Example Plots—

When a vector (or an observation) has a large magnitude, it will have a relatively large residual from an ML estimate for the vector when the ML anomaly detection model is trained with too few exemplars from the extremes of distributions of asset operation. As discussed above, a vector contains an observation from each sensor at one time step. Given N vectors in total that are available to use for training, some of the N available vectors are selected as exemplar vectors for training the ML anomaly detection model, and other vectors of the N available vectors are selected as test vectors for validating the ML anomaly detection model. In this case, residuals between the true observation with a large magnitude and an estimate for the observation are large because the L2 norms of the selected exemplar vectors are too limited, and more particularly, because the magnitude for individual sensor values in the exemplar vectors are too limited. Therefore, when sensor values in the test vectors have greater magnitudes than the maximal magnitudes of the sensor values in the exemplar vectors, the ML estimation will have large residuals compared to the true observation because the ML anomaly detection model does not predict values of an observation that are outside of the training range.

FIGS. 3, 4, 5, and 6 illustrate an example use of a graphical analysis to identify insufficient training of an ML anomaly detection model with data representing extremes of asset operation. In the example of FIGS. 3, 4, 5, and 6, an ML anomaly detection model is naïvely trained with too few exemplar vectors representing extremes of asset operation (such as idling or maximum operation), and the ML anomaly detection model is used to generate estimates for an example signal. Note that though FIGS. 3, 4, 5, and 6 show the magnitudes for just one example signal, the conclusions can be safely extended to the L2 norms of vectors containing the measurements at one time step for all signals. The conclusions hold true because where the signals are correlated (as is generally the case for multivariate analysis), a large magnitude for one signal at a given time step indicates a high probability of large magnitudes in other signals at that time step, and thus a large L2 norm of that vector.

Figure 3:
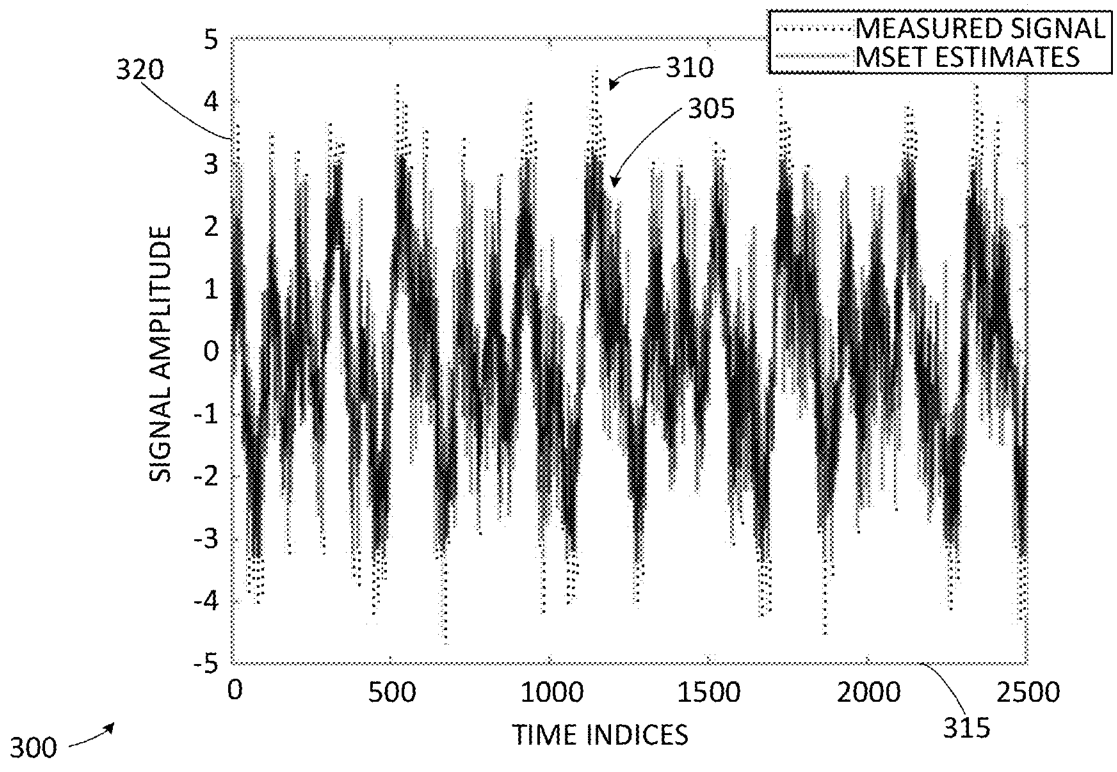
FIG. 3 illustrates an example signal amplitude plot of amplitude over time for one example signal, such as a signal collected by one sensor.

FIG. 3 illustrates an example signal amplitude plot 300 of amplitude over time for one example signal, such as a signal collected by one sensor. In signal amplitude plot 300, ML estimate values 305 for the example signal are plotted atop actual measured values 310 for the example signal. ML estimate values 305 and actual measured values 310 are plotted against a time index axis 315 and a signal amplitude axis 320. Actual measured values 310 are amplitude values sensed by the one sensor. ML estimate values 305 are amplitude values predicted for the example signal by an ML anomaly detection model. Time index axis 315 shows a progression of time steps or observations for the example signal. Signal amplitude axis 320 shows amplitude for the example signal. Amplitude represents an extent or level of operation of an asset sensed by the one sensor. Notice that the ML estimate values 305 often fall short of actual measured values 310 where the absolute value of the signal amplitude is larger, for example where the absolute value of the signal amplitude (or magnitude of the signal) is larger than about 3. This indicates that the ML anomaly detection model used to generate ML estimate values 305 was trained using too few exemplars with larger magnitudes for the example signal.

Figure 4:
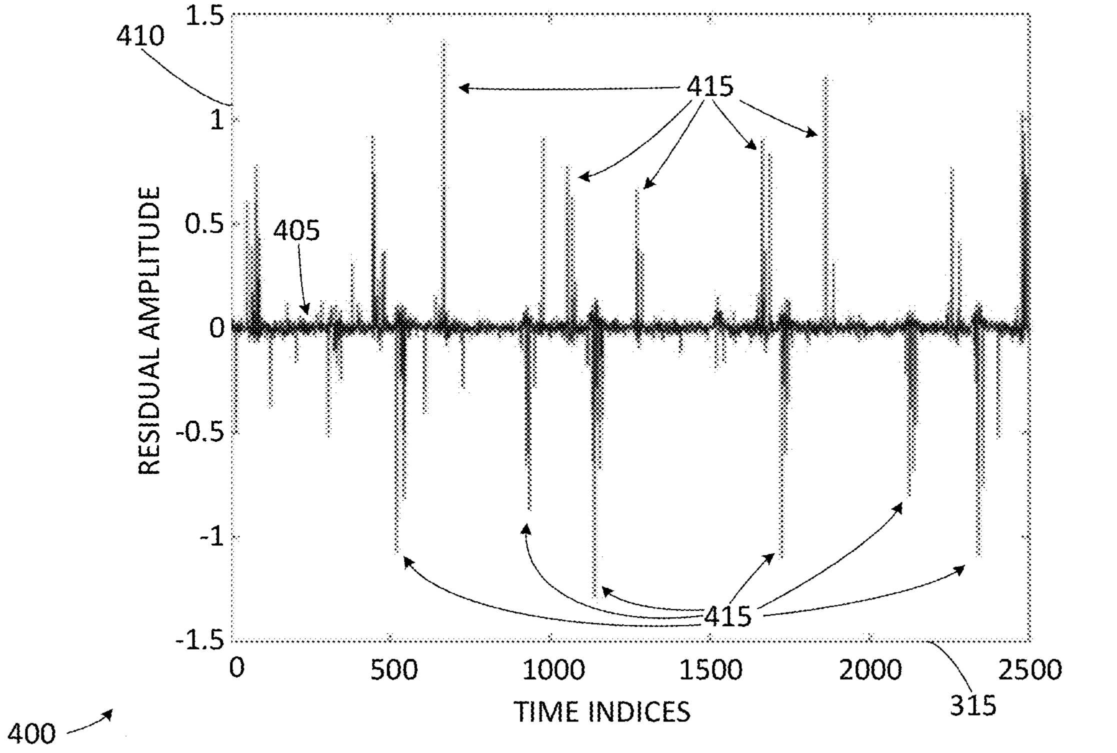
FIG. 4 illustrates an example residual amplitude plot of amplitude over time for residuals between ML estimate values and actual measured values.

FIG. 4 illustrates an example residual amplitude plot 400 of amplitude over time for residuals 405 between ML estimate values 305 and actual measured values 310. Residuals 405 are plotted against time index axis 315 and a residual amplitude axis 410. Residual amplitude axis 410 shows amplitude for the residuals. Notice the occasional spikes 415 in the residuals. Such spikes 415 should not occur because the actual measured values 310 are test values that represent correct or normal operation of an asset, and the ML estimate values 305 are produced by an ML anomaly detection model that has been trained with exemplar values that represent correct or normal operation of the asset. But, because the ML anomaly detection model has been trained with too few exemplars with signal values representing extremes of asset operation, estimates for extremes may result in improperly large residuals because the ML anomaly detection model does not predict signal values outside of the range included in the exemplars.

Figure 5:
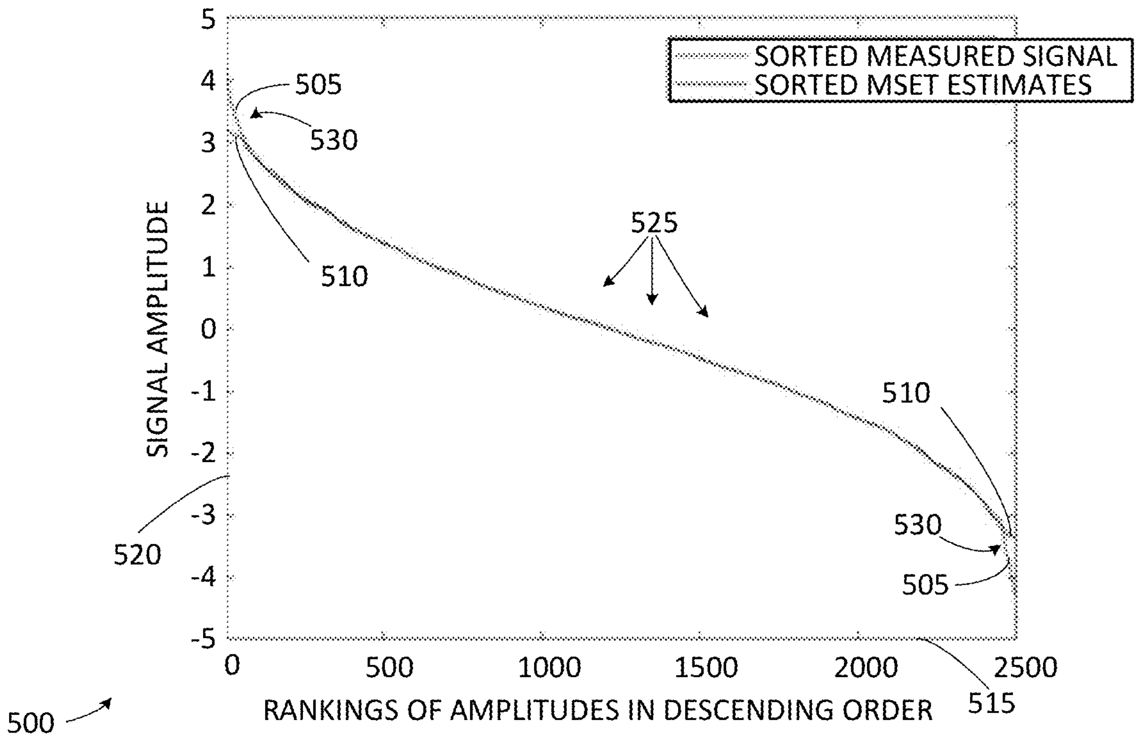
FIG. 5 illustrates an example ranked amplitude plot of signal amplitude values ranked or sorted in descending order of amplitude for the one example signal.

FIG. 5 illustrates an example ranked amplitude plot 500 of signal amplitude values ranked or sorted in descending order of amplitude for the one example signal. Sorted actual measured signal values 505 and sorted ML estimate values 510 are plotted together in ranked amplitude plot 500 against a rankings of amplitudes in descending order axis 515 and a signal amplitude axis 520. The majority of the sorted actual measured signal values 505 have an absolute value (or magnitude of the signal) less than about 3, or have an amplitude value between 3 and −3. For the majority of the sorted actual measured signal values 505 falling in this middle amplitude range between 3 and −3, the sorted ML estimate values 510 are closely aligned with the sorted actual measured signal values 505, as seen in a middle 525 of ranked amplitude plot 500. For a minority of the sorted actual measured signal values 505 falling in extreme signal amplitude ranges outside of the middle amplitude range between 3 and −3, the sorted ML estimate values 510 diverge from the sorted actual measured signal values 505, as seen at edges 530 of ranked amplitude plot 500.

Figure 6:
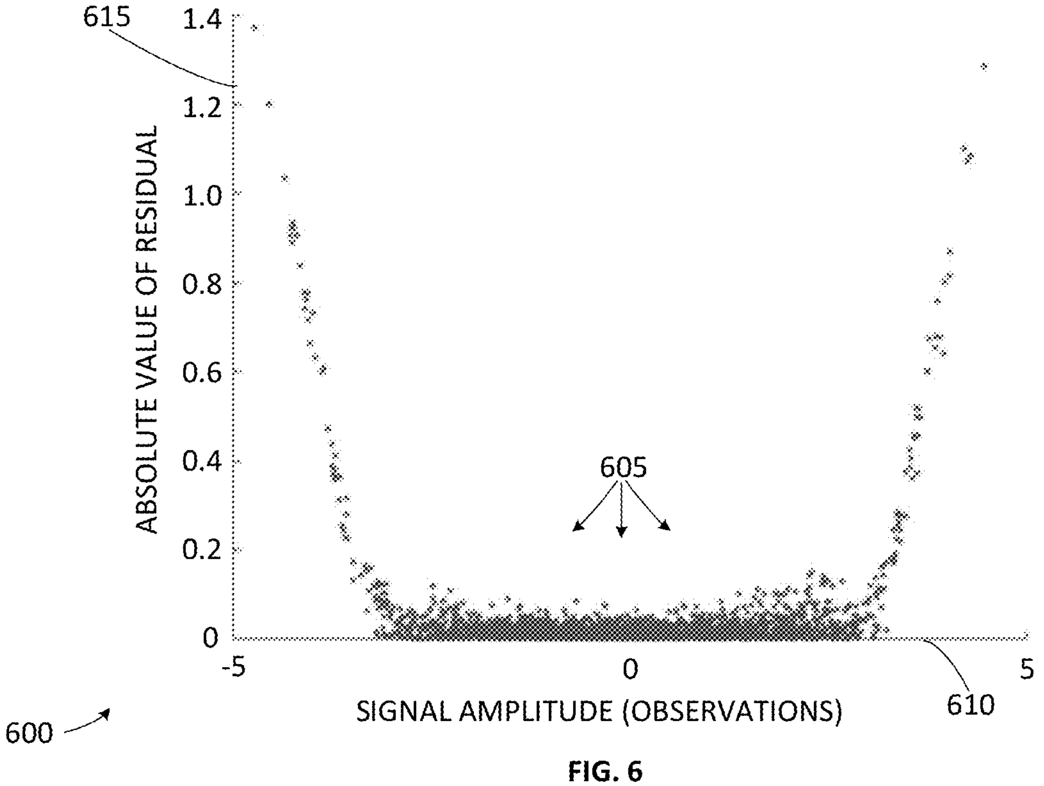
FIG. 6 illustrates an example histogram showing a distribution of residual magnitude (absolute value of residual amplitude) with respect to signal amplitude at the various observations.

FIG. 6 illustrates an example histogram 600 showing a distribution of residual magnitude 605 (absolute value of residual amplitude) with respect to signal amplitude at the various observations. Distribution of residual magnitude 605 is plotted against a signal amplitude axis 610 and an absolute value of residual axis 615. Note that in the middle amplitude range between 3 and −3, the magnitudes of the residuals are relatively low, falling below a value of 0.2. And, outside of the middle amplitude range between 3 and −3, the magnitudes of residuals climb rapidly. Distribution of residual magnitude 605 thus clearly shows that where the ML anomaly detection model is trained with too few exemplars from the extremes of asset operation, measured signal values that have a large magnitude with respect to other measured signal values, the residuals produced by the ML anomaly detection model for the measured signal values will be relatively large. This indicates the ML anomaly detection model trained with too few exemplars from the extremes of asset operation is inaccurate when estimating values at the extremes of asset operation.

—Example Iterative Exemplar Vector Reselection Method—

Figure 7:
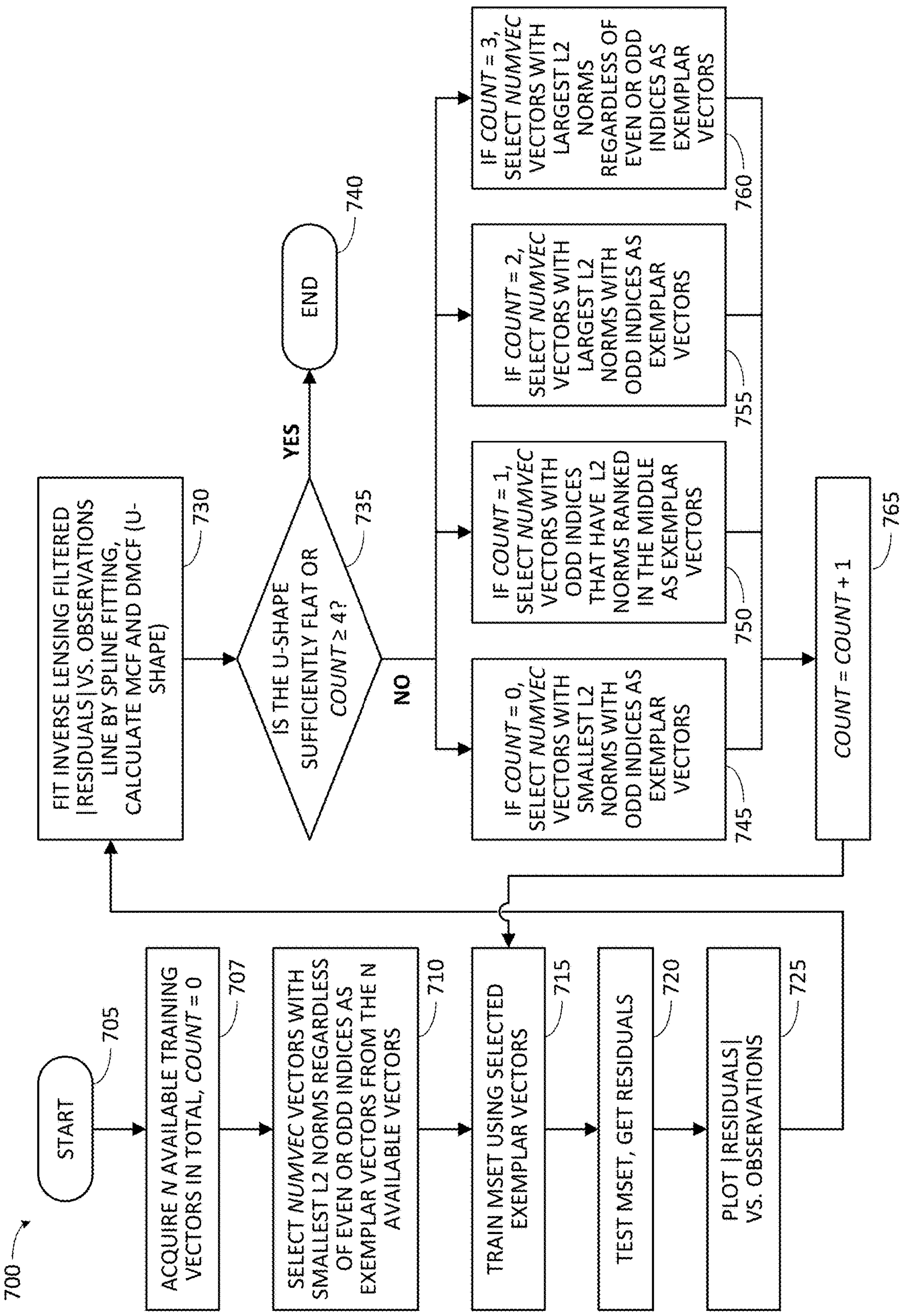
FIG. 7 illustrates one embodiment of an iterative exemplar vector reselection method associated with inverse-density exemplar selection for improved multivariate anomaly detection.

FIG. 7 illustrates one embodiment of an iterative exemplar vector reselection method 700 associated with inverse-density exemplar selection for improved multivariate anomaly detection. Iterative exemplar vector reselection method 700 is one embodiment of an inverse-density exemplar selection method. Iterative exemplar vector reselection method 700 includes a criterion or threshold to judge whether the selection of the exemplar vectors is satisfactory. In method 700, given a total number of exemplar vectors (numVecs) to select from all the N available vectors, in general the exemplar vectors are iteratively reselected to make the selected exemplar vectors have larger L2 norms. In each iteration, iterative exemplar vector reselection method 700 evaluates whether the selection is satisfactory based on a smoothness of a "U-shape" of a derivative of a mean cumulative function (dMCF) of residuals, as detailed below. If the selection of exemplar vectors is satisfactory for purposes of training an ML anomaly detection model, the U-shape is sufficiently flat so as to be a nearly a horizontal line approaching 0 everywhere. A sufficiently flat U-shape indicates that there are no large residuals (i.e., the difference between the true observation and its estimation) occurring in testing of the ML anomaly detection model.

In one embodiment, iterative exemplar vector reselection method 700 initiates at START block 705 in response to conditions similar to those which initiate inverse-density exemplar selection method 200. Following initiation at start block 705, processing continues to process block 707. At process block 707, iterative exemplar vector reselection method 700 acquires a set of N available training vectors (for example as described in detail above with reference to process block 210). Additionally, a count of iterations count is initiated to indicate that there have been no prior iterations of exemplar selection, for example by setting count to be 0.

At process block 710, iterative exemplar vector reselection method 700 selects from the training vectors a quantity (num Vecs) of the training vectors to be exemplar vectors. In one embodiment, the quantity (numVecs) is generally twice the number of signals or values in the vector. The training vectors that are selected to be exemplar vectors are those training vectors that have smallest L2 norms regardless of whether the index of an exemplar vector is even or odd. In one embodiment, this initial selection of exemplar vectors is performed as described above with reference to process blocks 220-225.

At process block 715, iterative exemplar vector reselection method 700 then trains an ML anomaly detection model using the selected memory vectors. For example, the ML anomaly detection model may be trained to generate estimates of what a test vector should be based on the exemplar vectors. In one embodiment, training the ML anomaly detection model using the selected exemplar vectors is performed as described above with reference to process block 230 and below under the heading "Multivariate ML Anomaly Detection".

At process block 720, iterative exemplar vector reselection method 700 then tests the trained ML anomaly detection model. And, iterative exemplar vector reselection method 700 generates residuals from estimates produced by the ML anomaly detection model during testing. In one embodiment, after training the ML anomaly detection model, a set of test vectors are selected from the training vectors that remain after the exemplar vectors are selected, and the trained ML anomaly detection model is used to generate estimates for the test vectors. In one embodiment, testing of the ML anomaly detection model and generation of residuals is performed as described above with reference to process block 235.

Figure 8:
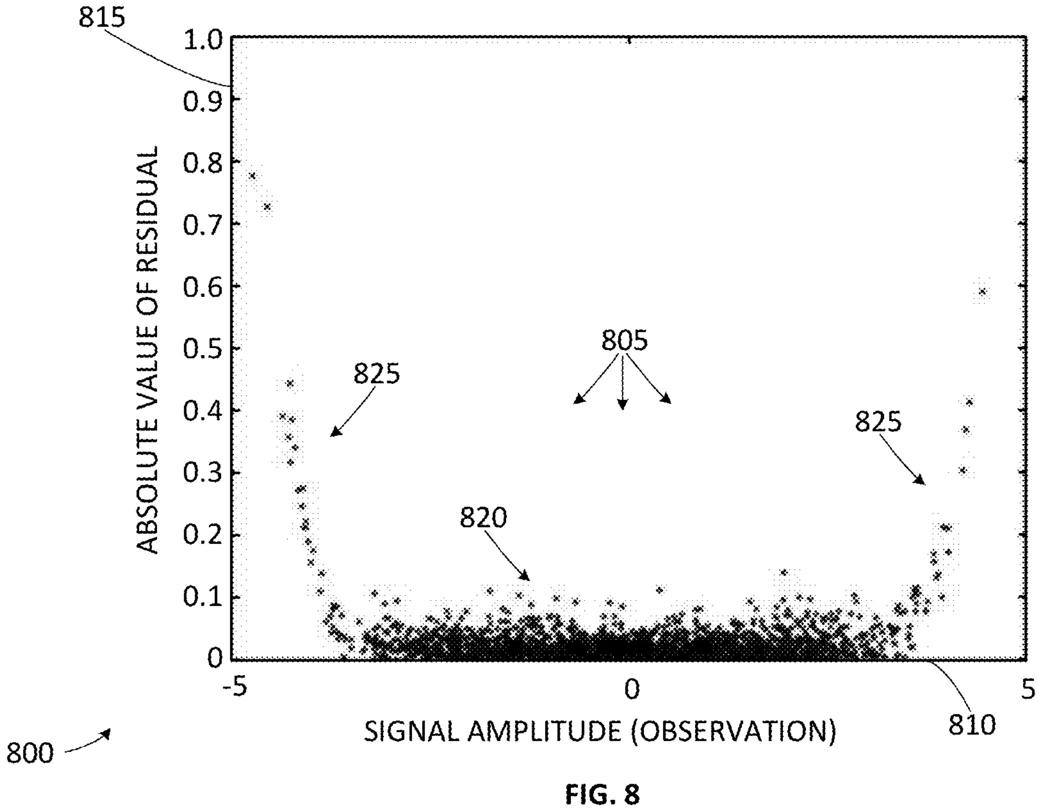
FIG. 8 illustrates an example plot of absolute values of residuals between test values and ML estimates for example signal.

At process block 725, iterative exemplar vector reselection method 700 plots the absolute values of the residuals against the observed (actual) values. In one embodiment the plots are made on an individual signal basis. That is, an individual plot is generated for residuals of an individual signal. The absolute values of the residuals are plotted with regard to the magnitude of observations. This plot will be roughly a U-shape, in which the middle part is thicker than the boundaries. Referring briefly to FIG. 8, FIG. 8 illustrates an example plot 800 of absolute values of residuals 805 between test values and ML estimates for one example signal. Absolute values of residuals 805 are plotted against a signal amplitude axis 810 and an absolute value of residual axis 815. Note the U-shape of the plot of the absolute values of residuals 805. Note a thicker middle part 820 of absolute values of residuals 805. Note the thinner boundaries 825 of absolute values of residuals 805.

Process block 730 provides a basis for determining whether the ML anomaly detection model is satisfactorily trained by the selected exemplar vectors. Iterative exemplar vector reselection method 700 filters the absolute value of the residuals using an inverse lensing filter. Then iterative exemplar vector reselection method 700 fits a line to the inverse lens filtered plot of the absolute values of the residuals by spline fitting. Iterative exemplar vector reselection method 700 then generates a mean cumulative function (MCF) of the residuals on the spline, and generates a derivative of the mean cumulative function (dMCF). In one embodiment, the ML anomaly detection model is trained and generates accurate measurements when a ratio between the maximum and minimum of the dMCF is low enough to satisfy a threshold.

In one embodiment, an inverse lensing filter is used to adjust the U-shape plot of residuals to have approximately a same thickness across the plot. The inverse lensing filter reduces the number of plotted residuals at thicker parts of the plot to give the plot of residuals a similar thickness, for example, by removing residuals and/or replacing residuals with averages of residuals. In one embodiment, the inverse lensing filter is a moving average process. When a moving average window is located near the boundaries or edges of the plot of residuals, residuals in the moving average window are replaced with an average of residual samples from relatively few samples (or even one sample). And, when the moving average window is located near the middle of the plot of residuals, residuals in the moving average window are replaced with an average of relatively many samples (for example, 20 or more samples). In one embodiment, the U-shape thus becomes a plot of averaged residual samples from windows with different sizes. In this way, the thickness in the middle part of the U-shape is decreased.

Figure 9:
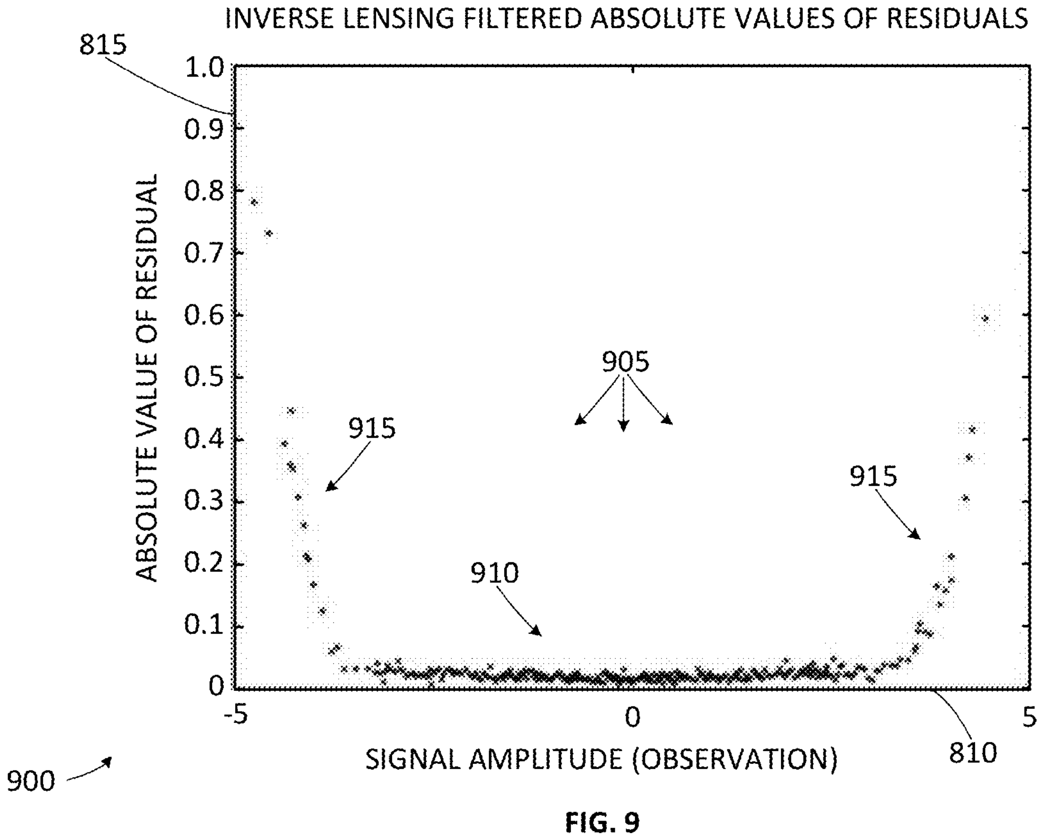
FIG. 9 illustrates an example plot of filtered residuals resulting from application of one embodiment of an inverse lensing filter.

Referring briefly to FIG. 9, FIG. 9 illustrates an example plot 900 of filtered residuals 905. Filtered residuals 905 result from applying one embodiment of an inverse lensing filter to absolute values of residuals 805 shown in example plot 800. Filtered residuals 905 are plotted against signal amplitude axis 810 and absolute value of residual axis 815. Note the U-shape of the plot of the filtered residuals 905. Note that a middle part 910 of the U-shape plot of the filtered residuals 905 is relatively thinner after inverse lensing filtering than a thicker middle part 820 shown in example plot 800. Note that boundary areas 915 are reduced very little in thickness, if at all, in comparison with boundaries 825 shown in example plot 800.

In one embodiment, the inverse lensing filter adjusts plotted absolute values of residuals in differing ways based on where a moving average window is positioned relative to middle and edges of a plot of absolute values of residuals. There may be multiple gradations of an extent of filtering applied to the residuals based on zones within the plot of absolute values of residuals. For example, there may be three or more zones in which the moving average window may be positioned: an outermost zone that includes a rightmost and leftmost set of absolute values of residuals, an innermost or middle zone centered on a middle of the plot of absolute values of residuals, and one or more moderate zones that includes absolute values of residuals between the innermost and outermost zones. The moderate zone may be further subdivided for additional fine control over adjustments made within the moderate zone. The inverse lensing filter accepts a set of absolute values of residuals (or "points") within the moving average window, and reports out or generates an adjusted set of absolute values of residuals (or "points") based on the position of the moving window within the zones.

In one embodiment, an outermost zone includes the left 5% and the right 5% of a range between the edges of the plot. In one embodiment, the inverse lensing filter retains each of the absolute values of residuals that are within a moving average window in the outermost zone. In one embodiment, a first moderate zone includes the next 5%-10% of the range inward from the outermost zone at left and right. In one embodiment, for residuals that are within a moving average window in the first moderate zone, inverse lensing filter averages every two consecutive absolute values of residuals and replaces the two consecutive absolute values of residuals with an average of the consecutive absolute values of residuals. In one embodiment, a second moderate zone includes the next 10%-25% of the range inward from the first moderate zone at left and right. In one embodiment, for residuals that are within a moving average window in the second moderate zone, inverse lensing filter averages every five consecutive absolute values of residuals and replaces the five consecutive absolute values of residuals with an average of the five consecutive absolute values of residuals. In one embodiment, a middle zone includes the middle 25% to 75% (starting from the left) of the range inward from the second moderate zone at left and right. In one embodiment, for residuals that are within a moving average window in middle zone, inverse lensing filter averages every ten consecutive absolute values of residuals and replaces the ten consecutive absolute values of residuals with an average of the ten consecutive absolute values of residuals.

In one embodiment, the inverse lensing filter moves along the plot of absolute values of residuals (for example from left to right) and creates a more uniform thickness of the plotted residuals from end to end. The more uniform density more readily allows fitting of a curve. For example, a moving window spline interpolation generates uniform samples of the residuals in the plot. Note, the uniform samples of the residuals on the spline may be interpolated samples generated by the moving window spline interpolation. Thus, in one embodiment, these interpolated, uniform samples of the residuals in are generated on the spline curve by the process of fitting the spline curve to the plotted residuals. The interpolated samples of residuals on the curve may also be referred to herein as "fitted residuals". Because the fitted residuals are generated by the spline fitting, the fitted residuals need not have overlapping values or otherwise share values with the plotted residuals, although they may.

Iterative exemplar vector reselection method 700 continues at process block 730 to fit a line (for example, a curved line) to the inverse lensing filtered plot of the absolute values of the residuals. In one embodiment, the line is fit by spline fitting (or spline interpolation). In spline fitting, relatively low-degree polynomials are fit piecewise to subsets of the absolute values of the residuals (rather than attempting to fit a high-degree polynomial to a full set of the absolute values of the residuals). Other curve fitting methods may also be used to fit the line to the inverse lens filtered plot of the absolute values of the residuals.

In one embodiment, spline interpolation is implemented on the averaged absolute values of residuals resulting from inverse lensing filtering. The spline interpolation generates a smooth line showing interpolated samples of the averaged absolute values of residuals. In one embodiment, a spline fitting is chosen that provides interpolated samples at x-coordinates that are evenly spaced at an interval. The interpolated samples are densely and evenly spaced, in contrast to the averaged absolute values of residuals resulting from inverse lensing filtering, which are not necessarily evenly spaced. At the completion of fitting the line, a line has been generated that has a satisfactory fit to the plotted data points for the absolute values of the residuals in the inverse lens filtered plot. The generated line may be defined by a mathematical function.

Figure 10:
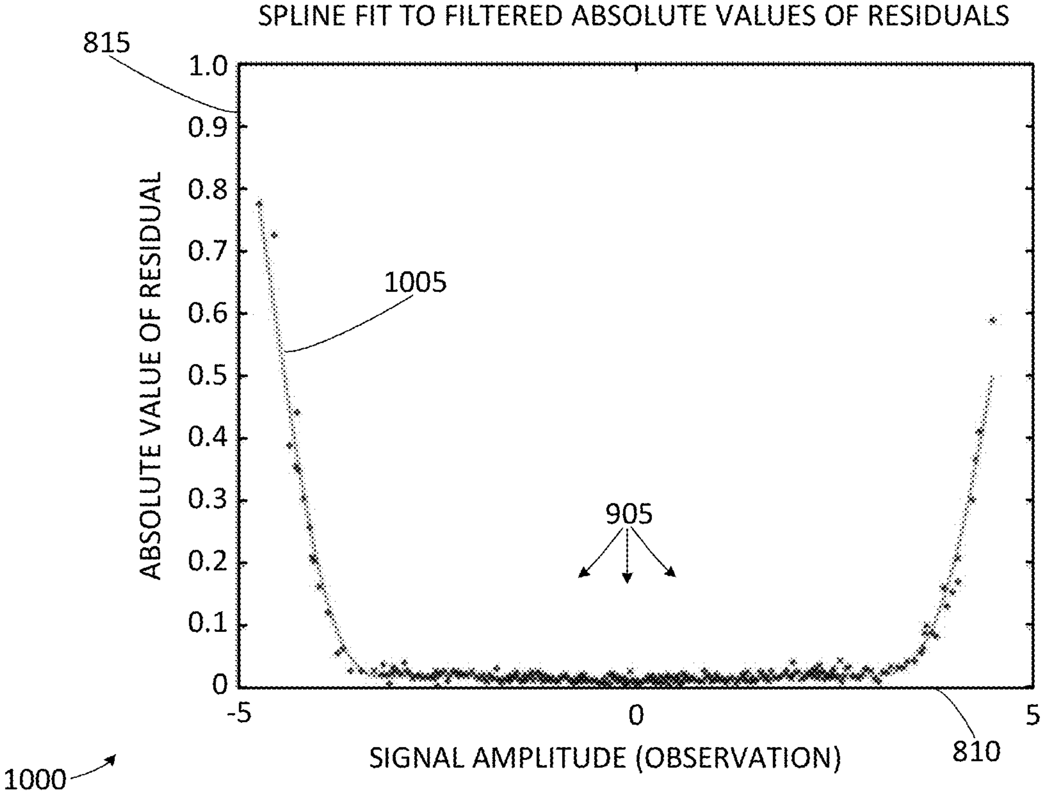
FIG. 10 illustrates an example plot of a line that is fit to filtered residuals.

Referring briefly to FIG. 10, FIG. 10 illustrates an example plot 1000 of a line 1005 that is fit to filtered residuals 905. Line 1005 is spline fit to filtered residuals 905. Line 1005 is plotted against signal amplitude axis 810 and absolute value of residual axis 815. Note the U-shape of line 1005 and the fit of line 1005 to the U-shaped plot of the filtered residuals 905.

Iterative exemplar vector reselection method 700 continues at process block 730 to generate a mean cumulative function (MCF) of the fitted spline. In one embodiment, the MCF of the samples on the fitted spline is calculated. For example, the samples on the fitted spline for which the MCF is calculated are the interpolated samples that are evenly spaced with respect to x-coordinate (on a signal amplitude axis). In one embodiment, the MCF value for a sample at a given x-coordinate is the sum of residual values for all samples at x-coordinates less than or equal to the given x-coordinate. In other words, the value of the MCF is the cumulative residual value as the signal amplitude increases. The MCF denoises the fitted spline (an empirical function of the plotted residuals) to create a curve for which numerical derivatives are simpler or more well-behaved than the fitted spline.

Iterative exemplar vector reselection method 700 then acquires the derivative of the mean cumulative function (dMCF) for the fitted spline by calculating the dMCF from the MCF. The dMCF provides a high-fidelity metric for determining whether the residuals for extreme and non-extreme vectors are sufficiently consistent (in other words, whether the U-shape is sufficiently flat). As discussed below, the metric may be a ratio of maximum to minimum value of the dMCF.

Figure 11:
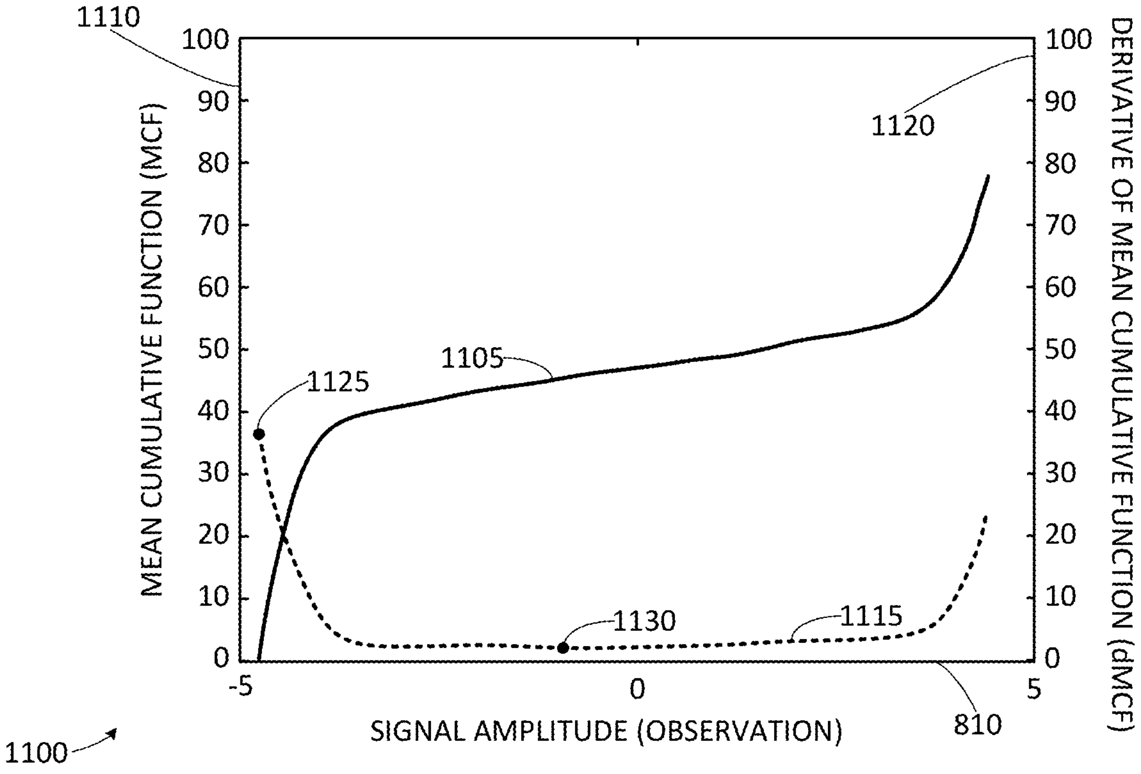
FIG. 11 illustrates an example plot of (i) an example mean cumulative function against a signal amplitude axis and a mean cumulative function axis, and (ii) an example derivative of the mean cumulative function against the signal amplitude axis and a derivative of mean cumulative function axis.

Referring briefly to FIG. 11, FIG. 11 illustrates an example plot 1100 of (i) an example MCF 1105 against signal amplitude axis 810 and a mean cumulative function axis 1110, and an example dMCF 1115 against signal amplitude axis 810 and a derivative of mean cumulative function axis 1120. Example MCF 1105 is the mean cumulative function of line 1005 shown in example plot 1000. Example dMCF 1115 is a numerical derivative of MCF 1105. A maximum value 1125 of dMCF 1115 and minimum value 1130 of dMCF 1115 are shown.

Once the dMCF is generated, process block 730 completes, and iterative exemplar vector reselection method 700 proceeds to decision block 735. In one embodiment, whether or not the selected exemplar vectors adequately train the ML anomaly detection model for accurate estimates at extremes of asset operation may be determined based on the maximum value and minimum value of the dMCF.

At decision block 735, iterative exemplar vector reselection method 700 determines whether a U-shape of the plot of absolute values of residuals is sufficiently flat. A sufficiently flat plot of absolute values of residuals indicates sufficient accuracy of ML estimates. The U-shape of the plot of absolute values of residuals may be determined to be sufficiently flat based on a derivative of a mean cumulative function of a line fit to the plot of absolute values of residuals.

Whether the U-shape is "sufficiently flat" can be determined based on a ratio of maximal value of the dMCF to minimal value of the dMCF. Lower values for the ratio indicate greater flatness of the U-shape, while higher values for the ratio indicate lesser flatness of the U-shape. The ratio may be compared to a pre-set threshold or criterion. Iterative exemplar vector reselection method 700 determines whether or not the ratio satisfies the threshold or criterion indicates. In one embodiment, the threshold may be a dMCF maximum:dMCF minimum ratio below a certain value. In one embodiment, a threshold of 100:1 or lower has been shown to significantly improve prognostic accuracy of ML anomaly detection models near the extrema of operational distributions of assets. For example, thresholds for the ratio of approximately 75:1, 50:1, and 25:1 each yield progressively better prognostic accuracy of ML anomaly detection models near the extrema of operational distributions.

If the U-shape of the plot of absolute values of residuals is sufficiently flat (735:YES), the selected exemplar vectors satisfactorily train the ML anomaly detection model, and iterative exemplar vector reselection method 700 proceeds to END block 740 and concludes. If the U-shape of the plot of absolute values of residuals is not sufficiently flat (735:NO), the ML anomaly detection model is not satisfactorily trained by the selected exemplar vectors, and iterative exemplar vector reselection method 700 increases a density of exemplar vectors that have higher L2 norms in the selected exemplar vectors and repeats the process of training, testing, plotting, filtering, fitting, generating the MCF and dMCF. The repetition continues until the U-shape is found to be sufficiently flat to indicate satisfactory training of the ML model, or until a cap on iterations is reached.

In one embodiment, the cap on iterations is 5 iterations, where the value of count is greater than or equal to 4. The cap on iterations means that no concentration of extreme vectors can be selected that is denser than the concentration selected in the previous iteration. In this example, the cap is 5 and there are 4 changes of selection criteria (described at process blocks 745, 750, 755, and 760) for incrementally increasing the concentration of extreme vectors beyond the concentration of initial selection at process block 710. Where there are more or fewer changes of selection criteria between an initial selection density (for example as described at process block 710) for extreme vectors and an ultimate selection density for extreme vectors (for example as described at process block 760), the cap will correspond to the number of changes to the selection criteria. (The ultimate selection density indicates that the concentration of extreme vectors can get no greater in a selection of exemplar vectors drawn from the training vectors in the set of time series readings.)

In one embodiment, the U-shape of the plot of absolute values of residuals may be further flattened—and the prognostic performance of the ML anomaly detection algorithm with regard to extreme asset activity may be further improved—by incrementally moving the selected exemplar vectors towards vectors that represent extreme activity by the asset. For example, an average magnitude of the selected exemplar vectors is iteratively increased. The increases in average magnitude may be achieved by adjusting selection criteria for selecting the exemplar vectors. Iterative exemplar vector reselection method 700 iteratively selects a progressively larger proportion of extreme vectors to be included in the exemplar vectors over one or more additional iterations.

As indicated at process block 710 above, the initial selection criteria is to select as exemplar vectors those training vectors that have smallest L2 norms regardless of whether the index of an exemplar vector is even or odd. Following a determination at decision block 735 that the initially selected training vectors resulted in an insufficiently accurate ML anomaly detection model (735:NO), the exemplar vectors will be reselected with adjusted or revised selection criteria that cause selection of exemplar vectors that represent incrementally more extreme activity. In one embodiment, the extent to which the selection criteria selects exemplar vectors that represent extreme activity by the asset is based on the number of times the selection criteria have previously been adjusted. In other words, the selection criteria are chosen based on a number of iterations of adjustment, which is given by a current value the count of iterations count. Process blocks 745, 750, 755, and 760 provide selection criteria that progressively increase the density of more extreme vectors and reduce the density of non-extreme vectors. Thus, in a first or initial iteration, iterative exemplar vector reselection method 700 selects a set of vectors that are lowest ranked by magnitude and that have both even-numbered indexes and odd-numbered indexes to be the exemplar vectors.

Exemplar vector reselection method 700 proceeds to process block 745 when there have been no prior adjustments to the selection criteria (count=0) and the U-shape is not sufficiently flat (735:NO). At process block 745, exemplar vector reselection method 700 re-selects from the training vectors the quantity (numVecs) of the training vectors to be exemplar vectors. The training vectors that are selected to be exemplar vectors are those training vectors that have smallest L2 norms and odd-numbered indices. (Or, alternatively, training vectors that are selected to be exemplar vectors are those training vectors that have smallest L2 norms and even-numbered indices.) The average value of the magnitude (measured by L2 norm) of the exemplar vectors is thus increased.

The adjusted criteria moves the selected exemplar vectors towards representing more extreme activity by selecting every other vector in order of increasing vector magnitude until quantity (numVecs) of exemplar vectors is selected. The exemplar vectors selected in this manner will include a greater density of extreme vectors (and a lower density of non-extreme vectors) than is obtained when selecting every vector in order of increasing vector magnitude until quantity (numVecs) of exemplar vectors is selected (as in process block 710). Thus, in a second iteration, iterative exemplar vector reselection method 700 selects a set of vectors that are lowest ranked by magnitude and that have one of either even-numbered indexes or odd-numbered indexes to be the exemplar vectors. Processing then proceeds to process block 765.

Exemplar vector reselection method 700 proceeds to process block 750 when there has been one prior adjustment to the selection criteria (count=1) and the U-shape is not sufficiently flat (735:NO). At process block 750, exemplar vector reselection method 700 re-selects from the training vectors the quantity (numVecs) of the training vectors to be exemplar vectors. The training vectors that are selected to be exemplar vectors are those training vectors that have odd-numbered indices and L2 norms ranked in the middle of the training vectors. (Or, alternatively, the training vectors that are selected to be exemplar vectors are those training vectors that have even-numbered indices and L2 norms ranked in the middle of the training vectors.) For example, the training vectors are ranked or sorted in order of L2 norm, a midpoint of the sorted training vectors is identified, and one half of the quantity (numVecs/2) training vectors with odd-numbered (or alternatively, even-numbered) indices outward from the midpoint on either side are selected to be exemplar vectors. The average value of the magnitude (measured by L2 norm) of the exemplar vectors is thus increased.

The adjusted criteria moves the selected exemplar vectors towards representing more extreme activity by selecting every other vector on either side of the midpoint to be exemplar vectors, working outward from the midpoint, until quantity (numVecs) of exemplar vectors is selected. The exemplar vectors selected in this manner will include a greater density of extreme vectors (and a lower density of non-extreme vectors) than is obtained when selecting every other vector in order of increasing vector magnitude, starting from the minimum vector magnitude, until quantity (numVecs) of exemplar vectors is selected (as in process block 745). Thus, in a third iteration, iterative exemplar vector reselection method 700 selects a set of vectors that are in a middle range of magnitude and that have one of either even-numbered indexes or odd-numbered indexes to be the exemplar vectors. Processing then proceeds to process block 765.

Exemplar vector reselection method 700 proceeds to process block 755 when there have been two prior adjustments to the selection criteria (count=2) and the U-shape is not sufficiently flat (735:NO). At process block 755, exemplar vector reselection method 700 re-selects from the training vectors the quantity (num Vecs) of the training vectors to be exemplar vectors. The training vectors that are selected to be exemplar vectors are those training vectors that have largest L2 norms and odd-numbered indices. (Or, alternatively, training vectors that are selected to be exemplar vectors are those training vectors that have largest L2 norms and even-numbered indices.) The average value of the magnitude (measured by L2 norm) of the exemplar vectors is thus increased.

The adjusted criteria moves the selected exemplar vectors towards representing more extreme activity by selecting every other one of the highest-magnitude vectors until quantity (numVecs) of exemplar vectors is selected. The exemplar vectors selected in this manner will include a greater density of extreme vectors (and a lower density of non-extreme vectors) than is obtained when selecting every other vector on either side of the midpoint to be exemplar vectors, working outward from the midpoint until quantity (numVecs) of exemplar vectors is selected (as in process block 750). Thus, in a fourth iteration, iterative exemplar vector reselection method 700 selects a set of vectors that are highest ranked by magnitude and that have one of either even-numbered indexes or odd-numbered indexes to be the exemplar vectors. Processing then proceeds to process block 765.

Exemplar vector reselection method 700 proceeds to process block 760 when there have been three prior adjustments to the selection criteria (count=3) and the U-shape is not sufficiently flat (735:NO). At process block 760, exemplar vector reselection method 700 re-selects from the training vectors the quantity (num Vecs) of the training vectors to be exemplar vectors. The training vectors that are selected to be exemplar vectors are those training vectors that have largest L2 norms regardless of odd-numbered or even numbered indices. In other words, the top numVecs training vectors in terms of magnitude are selected to be exemplar vectors. The average value of the magnitude (measured by L2 norm) of the exemplar vectors is thus increased.

The adjusted criteria moves the selected exemplar vectors towards representing the most extreme activity by selecting the top numVecs highest-magnitude vectors. The exemplar vectors selected in this manner will include a highest density of extreme vectors that are unique (and a lowest density of non-extreme vectors). The density of extreme vectors is thus higher than is obtained when selecting every other one of the highest-magnitude vectors until quantity (numVecs) of exemplar vectors is selected (as in process block 755). Thus, in a fifth iteration, iterative exemplar vector reselection method 700 selects a set of vectors that are highest ranked by magnitude and that have both even-numbered indexes and odd-numbered indexes to be the exemplar vectors. Processing then proceeds to process block 765.

At process block 765 the count of iterations count is incremented, for example increased by 1. Processing then returns to process block 715 to reiterate subsequent steps with the re-selected exemplar vectors.

Experimentation has validated that, in general, the U-shape of dMCF becomes iteratively flatter over the foregoing the iterations. Selection of exemplar vectors as described herein so as to flatten the U-shape of the absolute value of residuals during ML model testing results in much improved prognostic accuracy of ML anomaly detection models near the extrema of operational distributions.

—Multivariate ML Anomaly Detection—

In general, multivariate ML modeling techniques used for ML anomaly detection predict or estimate what each signal should be or is expected to be based on the other signals in the database. The predicted signal may be referred to as the "estimate". A multivariate ML anomaly detection model is used to make the predictions or estimates for individual variables based on the values provided for other variables. For example, for Signal 1 in a database of N signals, the multivariate ML anomaly detection model will compute an estimate for Signal 1 using signals 2 through N.

In one embodiment, the ML anomaly detection model may be a non-linear non-parametric (NLNP) regression algorithm used for multivariate anomaly detection. Such NLNP regression algorithms include auto-associative kernel regression (AAKR), and similarity-based modeling (SBM) such as the multivariate state estimation technique (MSET) (including Oracle's proprietary Multivariate State Estimation Technique (MSET2)). In one embodiment, the ML model may be another form of algorithm used for multivariate anomaly detection, such as a neural network (NN), Support Vector Machine (SVM), or Linear Regression (LR). In one embodiment, the inverse-density exemplar selection systems and methods described herein may be used to improve prognostic accuracy for the aforementioned algorithms.

The ML anomaly detection model is trained to produce estimates of what the values of variables should be based on training with a set of exemplar vectors that represent normal or correct operation of a monitored asset. To train the ML anomaly detection model, the exemplar vectors are provided in turn to the ML anomaly detection model. An exemplar vector includes one value for each variable of the ML anomaly detection model, one value from each signal of a set, collection, or database of time series signals at one time point. A configuration of correlation patterns between the variables of the ML anomaly detection model is automatically adjusted based on the values so as to cause the ML anomaly detection model to produce accurate estimates for each variable based on inputs to other variables. Sufficient accuracy of estimates to conclude the ML anomaly detection model to be sufficiently trained may be determined by residuals being minimized below a pre-configured training threshold. At the completion of training, the ML anomaly detection model has learned correlation patterns between variables that indicate that the monitored system is operating normally or correctly.

Following training, the ML anomaly detection model may be used to monitor vectors of signal values. Subtracting an actual, measured value for each signal from a corresponding estimate gives the residuals or differences between the values of the signal and estimate. Where there is an anomaly in a signal, the measured signal value departs from the estimated signal value. This causes the residuals to increase, triggering an anomaly alarm. Thus, the residuals are used to detect such anomalies where one or more of the residuals indicates such a departure, for example by becoming consistently excessively large.

For example, the presence of an anomaly may be detected by a sequential probability ratio test (SPRT) analysis of the residuals. The SPRT calculates a cumulative sum of the log-likelihood ratio for each successive residual between an actual value for a signal and an estimated value for the signal, and compares the cumulative sum against a threshold value indicating anomalous deviation. Where the threshold is crossed, an anomaly is detected, and an alert indicating the anomaly may be generated.

In one embodiment, an electronic alert is generated to indicate when the presence of an anomaly has been detected in the activity of a monitored asset. In one embodiment, the electronic alert is generated by composing and transmitting a computer-readable message. The computer readable message may include content describing the anomalous activity, such as time point at which the anomalous activity occurred, as well as signal descriptions and associated values at the time point and/or leading up to the time point. The computer readable message may also describe other information such as locations or operator profiles for the asset being monitored by the trained ML anomaly detection model. In one embodiment, an electronic alert may be generated and sent in response to an initial detection of anomalous activity. In one embodiment, a continual stream of electronic alerts may be generated and sent beginning with the initial detection of anomalous activity and continuing while the anomalous activity continues. The electronic alert may be composed and then transmitted for subsequent presentation on a display or other action.

In one embodiment, the electronic alert is a message that is configured to be transmitted over a network, such as a wired network, a cellular telephone network, wi-fi network, or other communications infrastructure. The electronic alert may be configured to be read by a computing device. The electronic alert may be configured as a request (such as a REST request) used to trigger initiation of a function in response to detection of the anomalous activity. The electronic alert may be presented in a user interface such as a graphical user interface (GUI) by extracting the content of the electronic alert by a REST API that has received the electronic alert.

In one embodiment, the detection of the anomalous activity and generation of alerts may be completed live, in real-time (or near real-time) so as to generate the electronic alert at a time substantially immediately following the occurrence of the anomalous activity. In one embodiment, as used herein "real-time" refers to substantially immediate operation that keeps pace with a throughput of a stream of data. In one embodiment, real-time operations are subject only to a minimal delay or latency that is acceptable in the context of live surveillance of an asset, which may vary based on the nature of the surveilled asset. In one embodiment, the detection of the anomalous activity and generation of the electronic alert may be performed at a later period in time in one or more batches.

—Cloud or Enterprise Embodiments—

In one embodiment, the present system (such as inverse-density exemplar selection system 100) is a computing/data processing system including a computing application or collection of distributed computing applications for access and use by other client computing devices that communicate with the present system over a network. In one embodiment, inverse-density exemplar selection system 100 is a component of a time series data service that is configured to gather, serve, and execute operations on time series data. The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system provides at least one or more of the functions disclosed herein and a graphical user interface to access and operate the functions. In one embodiment, inverse-density exemplar selection system 100 is a centralized server-side application that provides at least the functions disclosed herein and that is accessed by many users by way of computing devices/terminals communicating with the computers of inverse-density exemplar selection system 100 (functioning as one or more servers) over a computer network. In one embodiment inverse-density exemplar selection system 100 may be implemented by a server or other computing device configured with hardware and software to implement the functions and features described herein.

In one embodiment, the components of inverse-density exemplar selection system 100 may be implemented as sets of one or more software modules executed by one or more computing devices specially configured for such execution. In one embodiment, the components of inverse-density exemplar selection system 100 are implemented on one or more hardware computing devices or hosts interconnected by a data network. For example, the components of inverse-density exemplar selection system 100 may be executed by network-connected computing devices of one or more computer hardware shapes, such as central processing unit (CPU) or general-purpose shapes, dense input/output (I/O) shapes, graphics processing unit (GPU) shapes, and high-performance computing (HPC) shapes.

In one embodiment, the components of inverse-density exemplar selection system 100 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Components of inverse-density exemplar selection system 100 may (i) generate or compose an electronic message or signal to issue a command or request to another component, (ii) transmit the message or signal to other components of inverse-density exemplar selection system 100, (iii) parse the content of an electronic message or signal received to identify commands or requests that the component can perform, and (iv) in response to identifying the command or request, automatically perform or execute the command or request. The electronic messages or signals may include queries against databases. The queries may be composed and executed in query languages compatible with the database and executed in a runtime environment compatible with the query language.

In one embodiment, remote computing systems may access information or applications provided by inverse-density exemplar selection system 100, for example through a web interface server. In one embodiment, the remote computing system may send requests to and receive responses from inverse-density exemplar selection system 100. In one example, access to the information or applications may be effected through use of a web browser on a personal computer or mobile device. In one example, communications exchanged with inverse-density exemplar selection system 100 may take the form of remote representational state transfer (REST) requests using JavaScript object notation (JSON) as the data interchange format for example, or simple object access protocol (SOAP) requests to and from XML servers. The REST or SOAP requests may include API calls to components of inverse-density exemplar selection system 100.

—Software Module Embodiments—

In general, software instructions are designed to be executed by one or more suitably programmed processors accessing memory. Software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by an operating system (OS) or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

—Computing Device Embodiment—

Figure 12:
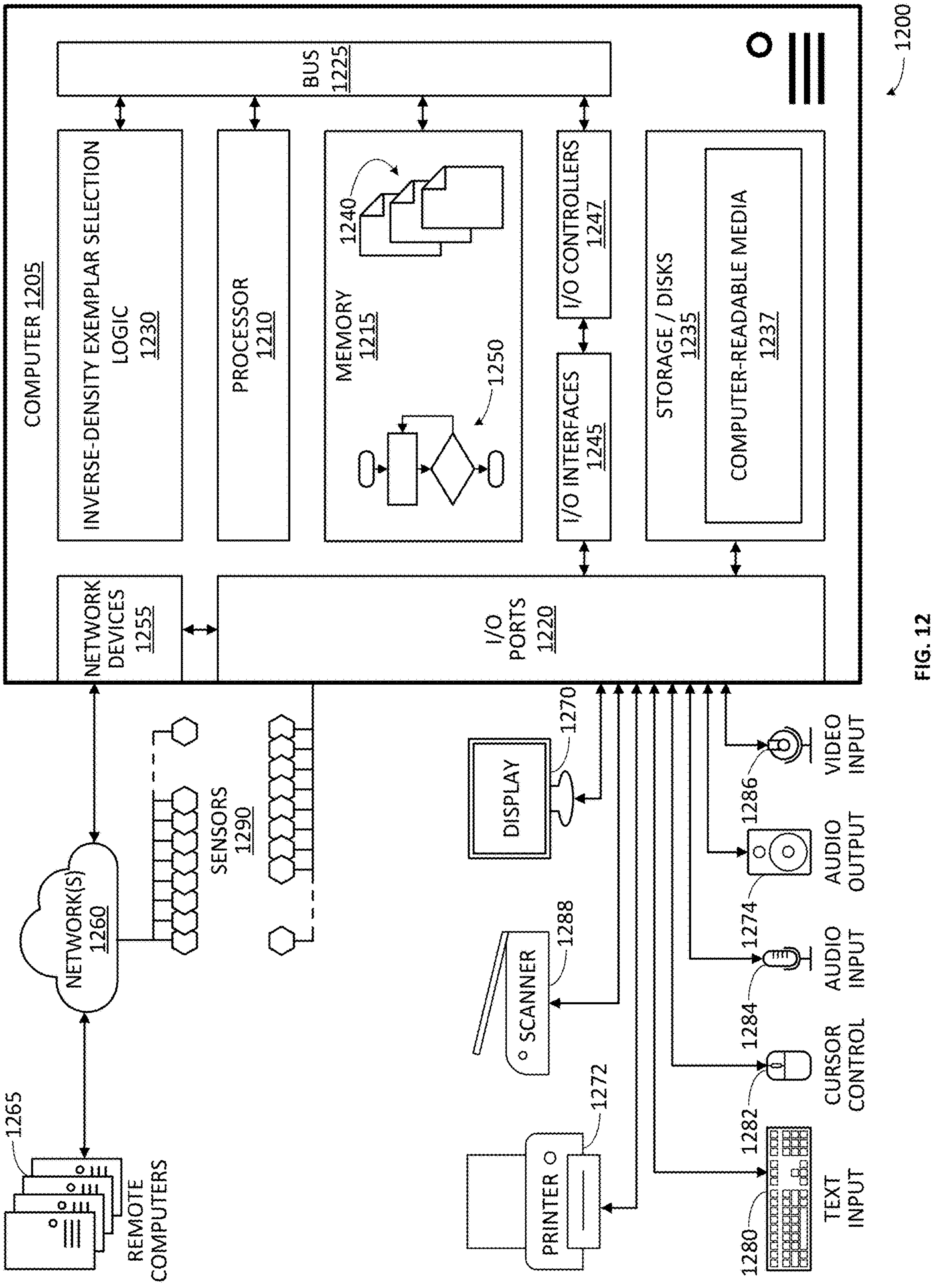
FIG. 12 illustrates an embodiment of a computing system configured with the example systems and/or methods disclosed.

FIG. 12 illustrates an example computing system 1200 that is configured and/or programmed as a special purpose computing device with one or more of the example systems and methods described herein, and/or equivalents. The example computing system 1200 may include a computer 1205 that includes at least one hardware processor 1210, a memory 1215, and input/output ports 1220 operably connected by a bus 1225. In one example, the computer 1205 may include inverse-density exemplar-selection logic 1230 configured to facilitate increased selection of exemplar vectors representing extremes of asset activity to increase accuracy of ML estimates for extreme activity, similar to logic, systems methods, and other embodiments shown in and described with reference to FIGS. 1, 2, and 7-11.

In different examples, the logic 1230 may be implemented in hardware, a non-transitory computer-readable medium 1237 with stored instructions, firmware, and/or combinations thereof. While the logic 1230 is illustrated as a hardware component attached to the bus 1225, it is to be appreciated that in other embodiments, the logic 1230 could be implemented in the processor 1210, stored in memory 1215, or stored in disk 1235.

In one embodiment, logic 1230 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to increase selection of exemplar vectors representing extremes of asset activity to increase accuracy of ML estimates for extreme activity, for example as shown and described herein. The means may also be implemented as stored computer executable instructions that are presented to computer 1205 as data 1240 that are temporarily stored in memory 1215 and then executed by processor 1210.

Logic 1230 may also provide means (e.g., hardware, non-transitory computer-readable medium that stores executable instructions, firmware) for performing increased selection of exemplar vectors representing extremes of asset activity to increase accuracy of ML estimates for extreme activity, for example as shown and described herein.

Generally describing an example configuration of the computer 1205, the processor 1210 may be a variety of various processors including dual microprocessor and other multi-processor architectures. A memory 1215 may include volatile memory and/or non-volatile memory. Non-volatile memory may include, for example, ROM, PROM, and so on. Volatile memory may include, for example, RAM, SRAM, DRAM, and so on.

A storage disk 1235 may be operably connected to the computer 1205 via, for example, an input/output (I/O)

interface (e.g., card, device) 1245 and an input/output port 1220 that are controlled by at least an input/output (I/O) controller 1247. The disk 1235 may be, for example, a magnetic disk drive, a solid-state drive, a floppy disk drive, a tape drive, a Zip drive, a flash memory card, a memory stick, and so on. Furthermore, the disk 1235 may be optical storage such as a CD-ROM drive, a CD-R drive, a CD-RW drive, a DVD ROM, and so on. The memory 1215 can store a process 1250 and/or a data 1240, for example. The disk 1235 and/or the memory 1215 can store an operating system that controls and allocates resources of the computer 1205.

The computer 1205 may interact with, control, and/or be controlled by input/output (I/O) devices via the input/output (I/O) controller 1247, the I/O interfaces 1245, and the input/output ports 1220. Input/output devices may include, for example, one or more displays 1270, printers 1272 (such as inkjet, laser, or 3D printers), audio output devices 1274 (such as speakers or headphones), text input devices 1280 (such as keyboards), cursor control devices 1282 for pointing and selection inputs (such as mice, trackballs, touch screens, joysticks, pointing sticks, electronic styluses, electronic pen tablets), audio input devices 1284 (such as microphones or external audio players), video input devices 1286 (such as video and still cameras, or external video players), image scanners 1288, video cards (not shown), disks 1235, network devices 1255, and so on. The input/output ports 1220 may include, for example, serial ports, parallel ports, and USB ports.

The computer 1205 can operate in a network environment and thus may be connected to the network devices 1255 via the I/O interfaces 1245, and/or the I/O ports 1220. Through the network devices 1255, the computer 1205 may interact with a network 1260. Through the network, the computer 1205 may be logically connected to remote computers 1265. Networks with which the computer 1205 may interact include, but are not limited to, a LAN, a WAN, and other networks.

In one embodiment, the computer may be connected to sensors 1290 through I/O ports 1220 or networks 1260 in order to receive information about physical states of monitored machines, devices, systems, or facilities (collectively referred to as "assets"). In one embodiment, sensors 1290 are configured to monitor physical phenomena occurring in or around an asset. The assets generally include any type of machinery or facility with components that perform measurable activities. In one embodiment, sensors 1290 may be operably connected or affixed to assets or otherwise configured to detect and monitor physical phenomena occurring in or around the asset. The sensors 1290 may be network-connected sensors for monitoring any type of physical phenomena. The network connection of the sensors 1290 and networks 1260 may be wired or wireless.

In one embodiment, computer 1205 is configured with logic, such as software modules, to collect readings from sensors 1290 and store them as observations in a time series data structure such as a time series database. In one embodiment, the computer 1205 polls sensors 1290 to retrieve sensor telemetry readings. In one embodiment, the sensor telemetry readings may be a time series of vectors with sensed values for each of sensors 1290. In one embodiment, the computer 1205 passively receives sensor telemetry readings actively transmitted by sensors 1290. In one embodiment, the computer 1205 receives one or more collections, sets, or databases of sensor telemetry readings previously collected from sensors 1290, for example from storage 1235 or from remote computers 1265.

—Definitions and Other Embodiments—

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method, comprising:

determining magnitudes of vectors from a set of time series readings collected from a plurality of sensors;

selecting exemplar vectors from the set of time series readings to train a machine learning model to detect anomalies by:

increasing a first density of extreme vectors that are within tails of a distribution of amplitudes for the time series readings based on the magnitudes of the vectors;

decreasing a second density of non-extreme vectors that are within a head of the distribution based on the magnitudes of the vectors; and training the machine learning model with the selected exemplar vectors;

wherein the increasing, decreasing, and training are performed repetitively until the machine learning model generates residuals within a threshold.

2. The computer-implemented method of claim 1, further comprising, repetitively:

generating the residuals with the trained machine learning model for test vectors selected from the set of time series readings; and analyzing the residuals to determine whether the residuals are within the threshold, wherein the threshold has a pre-set value that indicates that accuracy of the trained machine learning model is consistent between the test vectors that are selected from the tails of the distribution and the test vectors that are selected from the head of the distribution.

3. The computer-implemented method of claim 2, wherein analyzing the residuals to determine whether the residuals are within the threshold further comprises:

generating a plot of the residuals against corresponding actual values for which the residuals were generated;

fitting a spline curve to the plot of the residuals, wherein fitting the spline curve generates fitted residuals on the spline curve;

generating a mean cumulative function of the fitted residuals that are on the spline curve;

generating a derivative of the mean cumulative function;

finding a maximum value of the derivative of the mean cumulative function and a minimum value of the derivative of the mean cumulative function; and determining whether a ratio of the maximum value to the minimum value is below the pre-set value to determine whether the residuals are within the threshold.

4. The computer-implemented method of claim 3, further comprising, before fitting the spline curve to the plot of the residuals, filtering the residuals to reduce the residuals in the plot by a greater extent at a middle zone of the plot and by a lesser extent at an edge of the plot.

5. The computer-implemented method of claim 1, further comprising determining the magnitudes of the vectors from the set of time series readings by calculating L2 norms of the vectors, wherein the magnitudes of the vectors are the L2 norms of the vectors.

6. The computer-implemented method of claim 1, wherein selecting the exemplar vectors further comprises:

in a first iteration, selecting a first set of vectors that are lowest ranked by magnitude and that have both even-numbered indexes and odd-numbered indexes to be the exemplar vectors;

in a second iteration, selecting a second set of vectors that are lowest ranked by magnitude and that have one of either even-numbered indexes or odd-numbered indexes to be the exemplar vectors;

in a third iteration, selecting a third set of vectors that are in a middle range of magnitude and that have one of either even-numbered indexes or odd-numbered indexes to be the exemplar vectors;

in a fourth iteration, selecting a fourth set of vectors that are highest ranked by magnitude and that have one of either even-numbered indexes or odd-numbered indexes to be the exemplar vectors; and in a fifth iteration, selecting a fifth set of vectors that are highest ranked by magnitude and that have both even-numbered indexes and odd-numbered indexes to be the exemplar vectors.

7. The computer-implemented method of claim 1, wherein increasing the first density of the extreme vectors that are within the tails of the distribution and decreasing the second density of the non-extreme vectors that are within the head of the distribution further comprises selecting a progressively larger proportion of extreme vectors to be included in the exemplar vectors.

8. A non-transitory computer-readable medium that includes stored thereon computer-executable instructions that when executed by at least one processor of a computer system cause the computer system to:

determine magnitudes of vectors from a set of time series readings collected from a plurality of sensors;

select exemplar vectors from the set of time series readings to train a machine learning model to detect anomalies by repetitively:

increasing a first density of extreme vectors that are within tails of a distribution of amplitudes for the time series readings based on the magnitudes of the vectors;

decreasing a second density of non-extreme vectors that are within a head of the distribution based on the magnitudes of the vectors; and testing the machine learning model trained with the selected exemplar vectors to determine whether the machine learning model generates residuals within a threshold in order to reduce false or missed detection of the extreme vectors as anomalous by the machine learning model.

9. The non-transitory computer-readable medium of claim 8, further comprising instructions that when executed by the at least one processor cause the computer system to, repetitively:

train the machine learning model with the selected exemplar vectors;

generate the residuals with the trained machine learning model for test vectors selected from the set of time series readings; and analyze the residuals to determine whether the residuals are within the threshold, wherein the threshold has a pre-set value that indicates that accuracy of the trained machine learning model is consistent between the test vectors that are selected from the tails of the distribution and the test vectors that are selected from the head of the distribution.

10. The non-transitory computer-readable medium of claim 9, wherein the instructions to analyze the residuals to determine whether the residuals are within the threshold further cause the computer system to:

generate a plot of the residuals against corresponding actual values for which the residuals were generated;

fit a spline curve to the plot of the residuals;

generate a mean cumulative function of fitted residuals that are on the spline curve;

generate a derivative of the mean cumulative function;

find a maximum value of the derivative of the mean cumulative function and a minimum value of the derivative of the mean cumulative function; and determine whether a ratio of the maximum value to the minimum value is below the pre-set value to determine whether the residuals are within the threshold.

11. The non-transitory computer-readable medium of claim 10, further comprising instructions that when executed by the at least one processor cause the computer system to, before fitting the spline curve to the plot of the residuals, filter the residuals to reduce the residuals in the plot by a greater extent at a middle zone of the plot and by a lesser extent at an edge of the plot.

12. The non-transitory computer-readable medium of claim 8, further comprising instructions that when executed by the at least one processor cause the computer system to determine the magnitudes of the vectors from the set of time series readings by calculating L2 norms of the vectors, wherein the magnitudes of the vectors are the L2 norms of the vectors.

13. The non-transitory computer-readable medium of claim 8, wherein the computer-executable instructions to select exemplar vectors further cause the computer system to:

in a first iteration, select a first set of vectors that are lowest ranked by magnitude and that have both even-numbered indexes and odd-numbered indexes to be the exemplar vectors;

in a second iteration, select a second set of vectors that are lowest ranked by magnitude and that have one of either even-numbered indexes or odd-numbered indexes to be the exemplar vectors;

in a third iteration, select a third set of vectors that are in a middle range of magnitude and that have one of either even-numbered indexes or odd-numbered indexes to be the exemplar vectors;

in a fourth iteration, select a fourth set of vectors that are highest ranked by magnitude and that have one of either even-numbered indexes or odd-numbered indexes to be the exemplar vectors; and in a fifth iteration, select a fifth set of vectors that are highest ranked by magnitude and that have both even-numbered indexes and odd-numbered indexes to be the exemplar vectors.

14. The non-transitory computer-readable medium of claim 8, wherein the instructions for increasing the first density of the extreme vectors that are within the tails of the distribution and decreasing the second density of the non-extreme vectors that are within the head of the distribution further cause the computer system to select a progressively larger proportion of extreme vectors to be included in the exemplar vectors.

15. A computing system, comprising:

at least one processor connected to at least one memory;

a non-transitory computer readable medium including instructions stored thereon that when executed by the at least one processor cause the computing system to:

determine magnitudes of vectors from a set of time series readings collected from a plurality of sensors;

select exemplar vectors from the set of time series readings that have a first density of extreme vectors and a second density of non-extreme vectors, wherein the extreme vectors are within tails of a distribution of amplitudes for the time series readings based on the magnitudes of the vectors, and wherein the non-extreme vectors are within a head of the distribution of amplitudes based on the magnitudes of the vectors;

increase the first density of the extreme vectors in the selected exemplar vectors;

decrease the second density of the non-extreme vectors in the selected exemplar vectors;

train a machine learning model to detect anomalies based on the selected exemplar vectors; and analyze residuals generated from test vectors by the trained machine learning model to determine whether the residuals are within a threshold.

16. The computing system of claim 15, wherein the instructions further cause the computing system to repeatedly increase the first density of the extreme vectors, decrease the second density of the non-extreme vectors, train the machine learning model, and analyze residuals until the machine learning model generates residuals within the threshold, wherein the threshold has a pre-set value that indicates that accuracy of the trained machine learning model is consistent between the test vectors that are selected from the tails of the distribution and the test vectors that are selected from the head of the distribution.

17. The computing system of claim 15, wherein the instructions to analyze the residuals further cause the computing system to:

generate a plot of the residuals against corresponding actual values for which the residuals were generated;

fit a spline curve to the plot of the residuals;

generate a mean cumulative function of fitted residuals that are included on the spline curve by fitting the spline curve;

generate a derivative of the mean cumulative function;

find a maximum value of the derivative of the mean cumulative function and a minimum value of the derivative of the mean cumulative function; and determine whether a ratio of the maximum value to the minimum value is below a pre-set value to determine whether the residuals are within the threshold.

18. The computing system of claim 17, wherein the instructions further cause the computing system to, before fitting the spline curve to the plot of the residuals, filter the residuals to reduce the residuals in the plot by a greater extent at a middle zone of the plot and by a lesser extent at an edge of the plot.

19. The computing system of claim 15, wherein the instructions further cause the computing system to determine the magnitudes of the vectors from the set of time series readings by calculating L2 norms of the vectors, wherein the magnitudes of the vectors are the L2 norms of the vectors.

20. The computing system of claim 15, wherein the instructions to select the exemplar vectors further cause the computing system to iteratively select a progressively larger proportion of extreme vectors to be included in the exemplar vectors.

* * * * *